United States Patent
Hayward

(10) Patent No.: US 10,509,414 B1
(45) Date of Patent: *Dec. 17, 2019

(54) USING EMERGENCY RESPONSE SYSTEM (EMS) VEHICLE TELEMATICS DATA TO REDUCE ACCIDENT RISK

(71) Applicant: State Farm Mutual Automobile Insurance Company, Bloomington, IL (US)

(72) Inventor: Gregory Hayward, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/211,700

(22) Filed: Dec. 6, 2018

Related U.S. Application Data

(63) Continuation of application No. 15/798,093, filed on Oct. 30, 2017, now Pat. No. 10,216,194, which is a
(Continued)

(51) Int. Cl.
| | | |
|---|---|---|
| G05D 1/02 | (2006.01) | |
| G01C 21/34 | (2006.01) | |
| G01S 19/47 | (2010.01) | |
| G08G 1/127 | (2006.01) | |
| G06Q 40/08 | (2012.01) | |
| G08G 1/01 | (2006.01) | |
| G01S 19/51 | (2010.01) | |

(52) U.S. Cl.
CPC ....... *G05D 1/0278* (2013.01); *G01C 21/3415* (2013.01); *G01C 21/3492* (2013.01);
(Continued)

(58) Field of Classification Search
CPC ....... G05D 1/0278; G01S 19/51; G01S 19/47; G08G 1/0125; G08G 1/127; G06Q 40/08; G01C 21/3492; G01C 21/3415
See application file for complete search history.

(56) References Cited

U.S. PATENT DOCUMENTS

| | | | |
|---|---|---|---|
| 6,437,688 B1 | 8/2002 | Kobayashi | |
| 8,935,036 B1 * | 1/2015 | Christensen | ........... G07C 5/008 701/29.1 |

(Continued)

OTHER PUBLICATIONS

U.S. Appl. No. 14/798,609, Methods of Providing Insurance Savings Based Upon Telematics and Anonymous Driver Data, filed Jul. 14, 2015.
(Continued)

*Primary Examiner* — Yuen Wong
(74) *Attorney, Agent, or Firm* — State Farm Mutual Automobile Insurance Company

(57) ABSTRACT

A computer system configured to use emergency response system (EMS) vehicle telematics data to reduce risk of accidents may be configured to (1) receive, when the EMS vehicle is en route to an emergency location, the EMS vehicle telematics data associated with the EMS vehicle and including GPS location, speed, route, heading, acceleration, and/or lane data; (2) determine that a current route of an autonomous vehicle will interfere with the route of the EMS vehicle; (3) determine an alternate route for the autonomous vehicle to avoid interfering with the route of the EMS vehicle; and (4) direct the autonomous vehicle to (i) travel along the alternate route or (ii) pull over to a side of a road on the current route to allow the EMS vehicle to pass unimpeded. Insurance discounts may be generated based upon the risk mitigation or prevention functionality.

20 Claims, 6 Drawing Sheets

Related U.S. Application Data continuation of application No. 14/990,209, filed on Jan. 7, 2016, now Pat. No. 9,841,767.

(60) Provisional application No. 62/250,286, filed on Nov. 3, 2015, provisional application No. 62/247,334, filed on Oct. 28, 2015, provisional application No. 62/232,035, filed on Sep. 24, 2015, provisional application No. 62/232,045, filed on Sep. 24, 2015, provisional application No. 62/232,054, filed on Sep. 24, 2015, provisional application No. 62/232,050, filed on Sep. 24, 2015, provisional application No. 62/232,065, filed on Sep. 24, 2015, provisional application No. 62/232,097, filed on Sep. 24, 2015, provisional application No. 62/232,083, filed on Sep. 24, 2015, provisional application No. 62/232,075, filed on Sep. 24, 2015, provisional application No. 62/232,090, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(52) U.S. Cl.
CPC .............. *G01S 19/47* (2013.01); *G01S 19/51* (2013.01); *G06Q 40/08* (2013.01); *G08G 1/0125* (2013.01); *G08G 1/127* (2013.01)

(56) References Cited

U.S. PATENT DOCUMENTS

| | | | |
|---|---|---|---|
| 9,047,778 B1 * | 6/2015 | Cazanas | ................. G08G 1/166 |
| 9,129,449 B2 | 9/2015 | Davidson | |
| 9,679,487 B1 | 6/2017 | Hayward | |
| 9,783,159 B1 | 10/2017 | Potter et al. | |
| 9,786,154 B1 | 10/2017 | Potter et al. | |
| 10,054,453 B1 | 8/2018 | Hayward | |
| 10,055,982 B1 | 8/2018 | Hayward | |
| 10,055,985 B1 | 8/2018 | Hayward | |
| 2007/0054685 A1 | 3/2007 | Kellum | |
| 2007/0159354 A1 | 7/2007 | Rosenberg | |
| 2010/0015963 A1 | 1/2010 | Hesse et al. | |
| 2010/0191391 A1 | 7/2010 | Zeng | |
| 2010/0286864 A1 | 11/2010 | Kawauchi et al. | |
| 2013/0030642 A1 | 1/2013 | Bradley et al. | |
| 2013/0090139 A1 | 4/2013 | McHenry et al. | |
| 2013/0169812 A1 | 7/2013 | Lu et al. | |
| 2014/0081675 A1 | 3/2014 | Ives et al. | |
| 2014/0320260 A1 | 10/2014 | Van Wiemeersch et al. | |
| 2015/0077236 A1 | 3/2015 | Le Masurier | |
| 2015/0145995 A1 | 5/2015 | Shahraray et al. | |
| 2015/0179062 A1 * | 6/2015 | Ralston | .................. G01C 21/26 |
| | | | 701/117 |
| 2015/0262487 A1 | 9/2015 | Cazanas et al. | |
| 2016/0021178 A1 | 1/2016 | Liu et al. | |
| 2016/0232791 A1 | 8/2016 | Tosa et al. | |
| 2016/0277601 A1 | 9/2016 | Seymour | |
| 2016/0334227 A1 | 11/2016 | Davidson | |

OTHER PUBLICATIONS

U.S. Appl. No. 14/798,615, Methods of Providing Insurance Savings Based Upon Telematics and Driving Behavior Identification, filed Jul. 14, 2015.
U.S. Appl. No. 14/798,626, Methods of Providing Insurance Savings Based Upon Telematics and Usage-Based Insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data filed Jul. 14, 2015.
U.S. Appl. No. 14/798,750, Methods of Insurance Claim Buildup Detection Using Telematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No. 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert Notifications Utilizing Broadcasted Telematics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telematics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/989,979, Final Office Action, dated Apr. 24, 2017.
U.S. Appl. No. 14/989,979, Nonfinal Office Action, dated Nov. 30, 2016.
U.S. Appl. No. 14/989,979, Notice of Allowance, dated Sep. 14, 2017.
U.S. Appl. No. 14/969,990, Taking Corrective Action Based Upon Telematics a Broadcast from Another Vehicle, filed Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.
U.S. Appl. No. 14/990,073, Providing Insurance Discounts Based Upon Usage of Telematics Data-Based Risk Mitigation and Prevention Functionality, filed Jan. 7, 2016.
U.S. Appl. No. 14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.
U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,121, Notice of Allowance, dated Oct. 10, 2017.
U.S. Appl. No. 14/990,139, Final Office Action, dated Apr. 19, 2017.
U.S. Appl. No. 14/990,139, Nonfinal Office Action, dated Nov. 18, 2016.
U.S. Appl. No. 14/990,139, Notice of Allowance, dated Aug. 14, 2017.

(56) References Cited

OTHER PUBLICATIONS

U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.
U.S. Appl. No. 14/990,165, Notice of Allowance, dated Aug. 10, 2017.
U.S. Appl. No. 14/990,165, Using Train Telematics Data to Provide information in One or More Vehicles to Reduce Accident Risk, filed Jan. 7, 2016.
U.S. Appl. No. 14/990,209, Corrected Notice of Allowability, dated Aug. 28, 2017.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Notice of Allowance, dated Aug. 16, 2017.
U.S. Appl. No. 14/990,209, Using Emergency Response System (EMS) Vehicle Telematics Data to Reduce Accident Risk, filed Jan. 7, 2016.
U.S. Appl. No. 14/990,228, Broadcasting information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No. 14/990,228, Notice of Allowance, dated Aug. 31, 2017.
U.S. Appl. No. 15/484,791, Alert Notifications Utilizing Broadcasted Telematics Data, filed Apr. 11, 2017.
U.S. Appl. No. 15/484,791, Nonfinal Office Action, dated Oct. 18, 2017.
U.S. Appl. No. 15/787,293, Broadcasting Telematics Data to Nearby Mobile Computing Devices, Vehicles, and Infrastructure, filed Oct. 18, 2017.
U.S. Appl. No. 15/787,305, Determining Abnormal Traffic Conditions From a Broadcast of Telematics Data Originating From Another Vehicle, filed Oct. 18, 2017.
U.S. Appl. No. 15/787,311, Analyzing Telematics Data to Determine Travel Events and Corrective Actions, dated Oct. 18, 2017.
U.S. Appl. No. 15/787,317, Determining Corrective Actions Based Upon Broadcast of Telematics Data Originating From Another Vehicle, dated Oct. 18, 2017.
U.S. Appl. No. 15/798,019, Using Train Telematics Data to Reduce Accident Risk, flied Oct. 30, 2017.
U.S. Appl. No. 15/798,062, Using Train Telematics Data to Provide Information in One or More Vehicles to Reduce Accident Risk, filed Oct. 30, 2017.
U.S. Appl. No. 15/798,107, Broadcasting Information Related to Hazards Impacting Vehicle Travel, filed Oct. 30, 2017.

* cited by examiner

ing Train Telematics Data To Nearby Mobile computing devices, Vehicles, And Infrastructure," filed Nov. 3, 2015. The disclosure of each of the aforementioned applications is hereby expressly incorporated by reference herein in its entirety.

USING EMERGENCY RESPONSE SYSTEM (EMS) VEHICLE TELEMATICS DATA TO REDUCE ACCIDENT RISK

CROSS REFERENCE TO RELATED APPLICATIONS

This application is a continuation of, and claims the benefit of, U.S. patent application Ser. No. 15/798,093, entitled "Using Emergency Response System (EMS) Vehicle Telematics Data to Reduce Accident Risk" and filed Oct. 30, 2017, which is a continuation of U.S. patent application Ser. No. 14/990,209 (now U.S. Pat. No. 9,841,767), which is entitled "Using Emergency Response System (EMS) Vehicle Telematics Data To Reduce Accident Risk," which was filed Jan. 7, 2016, and which claims the benefit of (1) U.S. Provisional Patent Application No. 62/105,468, entitled "Broadcasting Telematics Data To Nearby Mobile computing devices, Vehicles, And Infrastructure," filed Jan. 20, 2015, (2) U.S. Provisional Patent Application No. 62/113,749, entitled "Broadcasting Telematics Data To Nearby Mobile computing devices, Vehicles, And Infrastructure," filed Feb. 9, 2015, (3) U.S. Provisional Patent Application No. 62/204,749, entitled "Broadcasting Telematics Data To Nearby Mobile computing devices, Vehicles, And Infrastructure," filed Aug. 13, 2015, (4) U.S. Provisional Patent Application No. 62/207,561, entitled "Generating Alert Notifications By Broadcasting Telematics Data To Nearby Mobile computing devices, Vehicles, And Infrastructure," filed Aug. 20, 2015, (5) U.S. Provisional Patent Application No. 62/232,035 entitled "Generating Alert Notifications By Broadcasting Telematics Data To Nearby Mobile computing devices, Vehicles, And Infrastructure," filed Sep. 24, 2015, (6) U.S. Provisional Patent Application No. 62/232,045, entitled "Generating Alert Notifications By Broadcasting Telematics Data To Nearby Mobile computing devices, Vehicles, And Infrastructure," filed Sep. 24, 2015, (7) U.S. Provisional Patent Application No. 62/232,050, entitled "Determining Abnormal Traffic Conditions From A Broadcast Of Telematics Data Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events And Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015, (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile computing devices, Vehicles, And Infrastructure," filed Sep. 24, 2015, (14) U.S. Provisional Patent Application No. 62/247,334, entitled "Generating Alert Notifications By Broadcasting Train Telematics Data To Nearby Mobile computing devices, Vehicles, And Infrastructure," filed Oct. 28, 2015, and (15) U.S. Provisional Patent Application No. 62/250,286, entitled "Generating Alert Notifications By Broadcast-

FIELD OF THE DISCLOSURE

The present disclosure generally relates to telematics data and, more particularly, to using telematics data to reduce risk of accidents.

BACKGROUND

Conventional telematics devices may collect certain types of data that relate to operation of a vehicle. However, conventional telematics devices and data gathering techniques may have several drawbacks.

BRIEF SUMMARY

In one aspect, telematics data and/or geographic location data may be collected, monitored, measured, and/or generated by one or more computing devices associated with a vehicle (e.g., a non-emergency vehicle such as a passenger vehicle). In another aspect, telematics data and/or geographic location data may be collected, monitored, measured, and/or generated by one or more computing devices associated with an emergency response system (EMS) vehicle. The telematics data may include various metrics that indicate the direction, speed, and/or motion of the vehicle or EMS vehicle with which the data is associated. The geographic location data may include a geographic location of the vehicle or EMS vehicle, such as latitude and longitude coordinates, for example. The one or more computing devices may include a mobile computing device positioned within the vehicle or EMS vehicle, an on-board computer, an EMS vehicle controller (e.g., a smart EMS vehicle controller), and/or a combination of these devices working in conjunction with one another. The one or more computing devices may broadcast the telematics data and/or the geographic location data to one or more other devices.

The telematics data and/or the geographic location data may be received and/or processed by one or more other computing devices to determine whether an anomalous condition exists (e.g., whether a route of an EMS vehicle will interfere with a route of a (non-emergency) vehicle). These one or more other computing devices may be external computing devices (e.g., a remote server), another mobile computing device, an infrastructure component (e.g., a traffic light, which may be a "smart" traffic light as further discussed below), etc. If an anomalous condition is detected, the geographic location of the vehicle and/or EMS vehicle associated with the telematics data may be used as a condition to decide whether to generate an alert at (or send an alert notification to) one or more other computing devices associated with nearby vehicles.

In one aspect, a computer system configured to use emergency response system (EMS) vehicle telematics data to reduce risk of accidents may be provided. A computer system may include at least one of one or more processors or transceivers. The at least one of the one or more processors or the transceivers may be configured to: (1) receive, via wireless communication or data transmission, the EMS vehicle telematics data associated with an EMS vehicle directly or indirectly from the EMS vehicle when the EMS vehicle is en route to an emergency location, the EMS vehicle telematics data including at least one of Global Positioning System (GPS) location, speed, route, heading, acceleration, or lane data; (2) determine, based upon the EMS vehicle telematics data, that a current route of an autonomous vehicle will interfere with the route of the EMS vehicle to the emergency location; (3) determine an alternate route for the autonomous vehicle to take to avoid interfering with the route of the EMS vehicle to the emergency location; and/or (4) direct the autonomous vehicle to one of (i) travel along the alternate route, or (ii) pull over to a side of a road on the current route of the autonomous vehicle to allow the EMS vehicle to pass unimpeded to facilitate safe travel for EMS vehicles. The at least one of the one or more processors or the transceivers may be configured to perform additional, fewer, or alternate actions, including those discussed elsewhere herein.

In another aspect, a computer-implemented method of using emergency response system (EMS) vehicle telematics data to reduce risk of accidents may be provided. A method may include: (1) receiving, via at least one of one or more autonomous vehicle processors of an autonomous vehicle or associated transceivers via wireless communication or data transmission, the EMS vehicle telematics data associated with an EMS vehicle directly or indirectly from the EMS vehicle when the EMS vehicle is en route to an emergency location, the EMS vehicle telematics data including at least one of GPS location, speed, route, heading, acceleration, or lane data; (2) determining, via the one or more autonomous vehicle processors based upon the EMS vehicle telematics data, that a current route of the autonomous vehicle will interfere with the route of the EMS vehicle to the emergency location; (3) determining, via the one or more autonomous vehicle processors, an alternate route for the autonomous vehicle to take to avoid interfering with the route of the EMS vehicle to the emergency location; and/or (4) directing, via the one or more autonomous vehicle processors, the autonomous vehicle to one of (i) travel along the alternate route, or (ii) pull over to a side of a road on the current route of the autonomous vehicle to allow the EMS vehicle to pass unimpeded to facilitate safe travel for EMS vehicles. The method may include additional, fewer, or alternate actions, including those discussed elsewhere herein.

In yet another aspect, a system of using emergency response system (EMS) vehicle telematics data to reduce risk of accidents may be provided. A system may include: (1) an EMS vehicle configured to broadcast the EMS vehicle telematics data associated with the EMS vehicle while the EMS vehicle is en route to an emergency location, the EMS vehicle telematics data including at least one of GPS location, speed, route, heading, acceleration, or lane data; and/or (2) an autonomous vehicle. The autonomous vehicle may be configured to: (a) receive the EMS vehicle telematics data directly or indirectly from the EMS vehicle; (b) determine, based upon the EMS vehicle telematics data, that a current route of the autonomous vehicle will interfere with the route of the EMS vehicle to the emergency location; (c) determine an alternate route for the autonomous vehicle to take to avoid interfering with the route of the EMS vehicle to the emergency location; and/or (d) perform one or more of (i) directing the autonomous vehicle to travel along the alternate route, or (ii) directing the autonomous vehicle to pull over to a side of a road on the current route of the autonomous vehicle to allow the EMS vehicle to pass unimpeded to facilitate safe travel for EMS vehicles. The EMS vehicle and/or the autonomous vehicle may be configured to perform additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
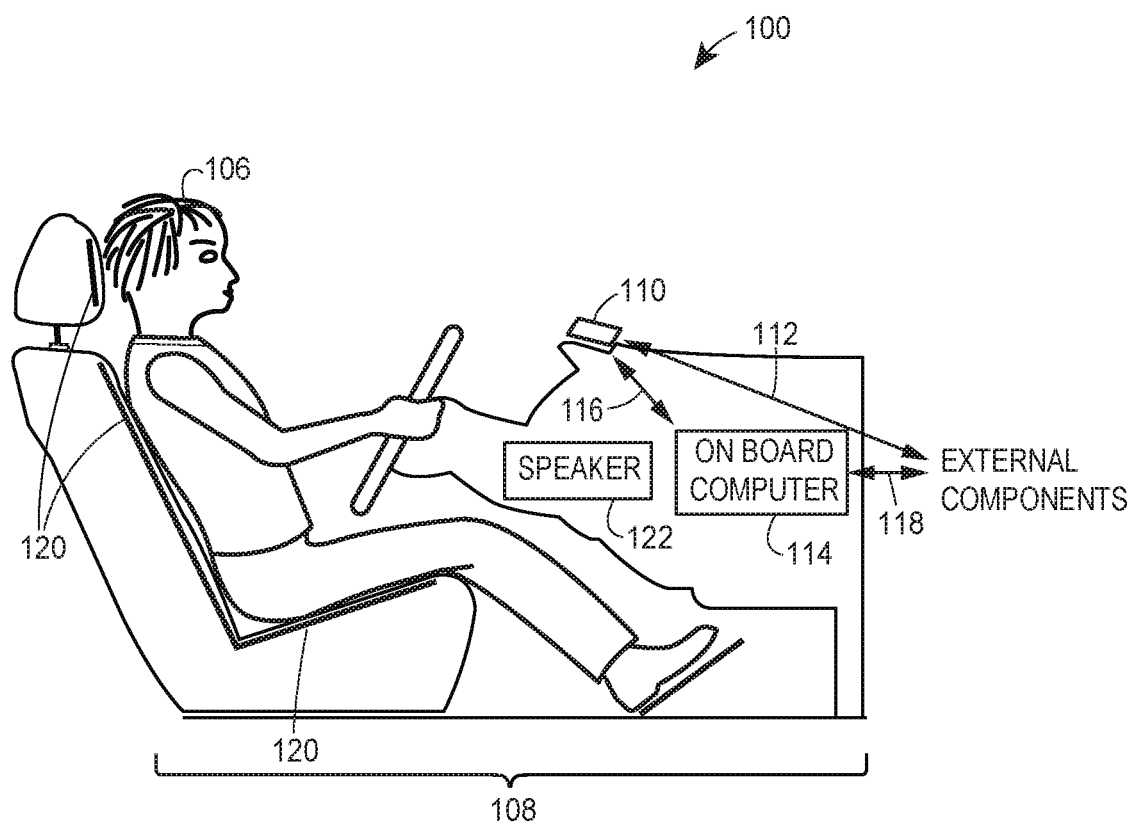
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition associated with an emergency response system (EMS) vehicle (e.g., police vehicle, fire truck, ambulance, etc.) is detected at a location associated with a non-emergency vehicle. For example, determining that an anomalous condition is detected may include determining that a current route of a non-emergency vehicle, such as an autonomous or semi-autonomous vehicle, will interfere with a route that an EMS vehicle is traveling to a location of an emergency. Determining whether the anomalous condition is detected may be performed using one or more computing devices within or otherwise associated with the non-emergency vehicle (a non-emergency vehicle at times being referred to herein as a "vehicle," whereas an emergency response system vehicle may be referred to herein as an "EMS vehicle"). If the detected anomalous condition may impact or affect another (non-emergency) vehicle on the road, embodiments are described to generate and/or send alert notifications to other vehicles that may be so affected. As further described throughout the disclosure, the process of detecting anomalous conditions and whether they apply to other vehicles may be performed through an analysis of geographic location data and/or telematics data broadcasted from one or more computing devices within or otherwise associated with one or more respective vehicles or the EMS vehicle.

The present embodiments may relate to collecting, transmitting, and/or receiving telematics data; and may include a mobile device, a vehicle-mounted processor, an EMS vehicle controller (e.g., a smart EMS vehicle controller), computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, an EMS vehicle traveling along a route that will interfere with a current route of a non-emergency vehicle, etc.

To address these and other problems, telematics data (and/or driver behavior or vehicle information) may be captured in real-time, or near real-time, by a mobile device of a vehicle driver (or passenger) and/or a mobile device, EMS vehicle controller, etc. of an EMS vehicle. The mobile device and/or other device as described herein may be specifically configured for gathering, collecting, and/or generating telematics and/or other data as a vehicle and/or EMS vehicle is traveling.

For instance, the mobile device may be equipped with (i) various sensors and/or meters capable of generating telematics data (Global Positioning System (GPS) unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or an infrastructure component—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle and/or EMS vehicle is moving. Additionally or alternatively, the web page may allow the mobile device to upload or transmit data in real-time, or near real-time, to a mobile device of a second driver, a remote server, an infrastructure component, and/or another (e.g., smart) vehicle.

Additionally or alternatively, a smart vehicle controller or processor and/or a smart EMS vehicle controller or processor may be configured with the same functionality as that of the mobile device described above. For instance, a smart vehicle and/or EMS vehicle controller may include an application, software module, or computer instructions that provide for the telematics and/or other data collection and generation functionality discussed herein. The smart vehicle and/or EMS vehicle controller may be in wired or wireless communication with various ("smart" or "dumb") vehicle-mounted and/or EMS vehicle-mounted meters, sensors, and/or detectors, such as speedometers, speed sensors, compasses, gyros, accelerometers, etc., that collect and/or generate telematics data and/or other data detailing or associated with vehicle and/or EMS vehicle operation, and/or driving or driver behavior.

In one aspect, by solving problems with collecting telematics data and/or other data associated with driver behavior, vehicle operation or performance, and/or EMS vehicle operation or performance, problems with vehicle navigation and/or vehicle operation may be resolved. For instance, telematics data associated with a first vehicle and/or an EMS vehicle may be collected in real-time by a mobile device of a first driver and/or a mobile device associated with the EMS vehicle. The mobile device(s) may be specifically configured to gather or generate telematics and/or other driver/vehicle/EMS vehicle data in real-time as the vehicle and/or EMS vehicle is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers; EMS vehicle route interfering with non-emergency vehicle route, etc.), the telematics (and/or data) data collected may indicate such.

The mobile device itself (and/or Telematics App) may be configured to identify the type of traffic event and transmit the type of traffic event to other mobile devices, a remote server, smart vehicles, and/or an infrastructure component. In one embodiment, the mobile device (and/or Telematics App) may be in wireless communication with a smart vehicle control system of the vehicle and/or a smart EMS vehicle controller or control system of the EMS vehicle, and the smart vehicle control system and/or smart EMS vehicle controller or control system may transmit the telematics and/or other data, and/or any associated warnings, to a remote server, and/or roadside smart infrastructure or nearby mobile devices or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (of another driver), a second and smart vehicle, a remote server, and/or road side infrastructure (smart street signs or road posts, smart toll booths, smart traffic lights, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, re-route vehicles, and/or direct vehicles to pull over. For instance, the second computing device may cause a display screen or user interface of a mobile device or smart vehicle controller of remote drivers to display a map with (1) a current route that the vehicle is on, (2) a virtual representation of the traffic event (e.g., EMS vehicle approaching), (3) an alternate or recommended new route to an original destination that avoids the EMS vehicle, and/or (4) a direction to pull over to a side of a road on the current route to allow the EMS vehicle to pass.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds;" "turn left to find an open parking space;" "traffic is stopped 1.5 miles ahead;" "traffic has slowed to 20 mph 1.5 miles (or 2 blocks) ahead;" "recommended speed for turn ahead is 30 mph;" "ice on bridge (or ramp) ahead;" "pull over to side of road—an EMS vehicle is approaching behind you," etc.

As an example, a first mobile device may be traveling in a vehicle. The first mobile device may collect telematics data and/or other data, such as via a telematics application running on one or more processors mounted within the first mobile device. The first mobile device (and/or the telematics application) may detect a travel event from the data collected. For instance, the first mobile device (and/or the telematics application executing thereon) may determine that the vehicle is located on the highway, but the vehicle is moving slower than the posted speed limit; that a current route of the vehicle will interfere with a route being traveled by an EMS vehicle, etc. The first mobile device (and/or the telematics application) may then transmit the data collected and/or an associated message via wireless communication or data transmission to smart roadside infrastructure and/or nearby vehicles (or a second mobile device traveling within a nearby and second vehicle).

The second mobile device (and/or a telematics application running thereon) may then, using the data received and/or message received from the first mobile device, generate an audible or visual warning or alert of the travel event, such as "Warning, congestion ahead," "Warning, EMS vehicle approaching from behind," "EMS vehicle approaching traffic light (or intersection ahead)," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead;" "High speed vehicle approaching from rear;" And/or "High speed vehicle approaching from ahead."

Other messages or alerts that may be generated from mobile devices (and/or telematics applications executing thereon), smart vehicle controllers, smart EMS vehicle controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead;" "Traffic light directly ahead will change from Green to Red starting in 5 seconds;" "Stranded vehicle on right side of road half a mile ahead;" "Recommend turning right at next intersection to avoid travel event 3 blocks ahead;" "EMS vehicle approaching two cross streets ahead, take alternate route;" and/or other travel or traffic event-related messages.

An insurance provider may collect data indicative of an insured's having of and/or usage of the vehicle safety functionality provided herein (e.g., functionality associated with receiving a wireless communication broadcast or broadcasts including EMS vehicle telematics data, analyzing the EMS vehicle telematics data, and directing corrective actions based upon the EMS vehicle telematics data, as further discussed below). For instance, such data may be collected at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device of the insured (e.g., for display on a mobile device of the insured).

Telematics and Vehicle Navigation

In one aspect, by solving problems with collecting telematics data and/or other data associated with driver behavior, vehicle operation or performance, and/or EMS vehicle operation or performance, problems with vehicle navigation and/or vehicle operation may be resolved. For instance, telematics data associated with a first vehicle and/or an EMS vehicle may be collected in real-time by a mobile device of a first driver and/or a mobile computing device associated with the EMS vehicle. The mobile device(s) may be specifically configured to gather or generate telematics and/or other driver/vehicle/EMS vehicle data in real-time as the vehicle and/or EMS vehicle is traveling. If a traffic event is encountered, about to be encountered, and/or expected or anticipated to be encountered by the vehicle as it travels (e.g., road construction; heavy traffic; congestion; bad weather conditions, unlawful, unexpected or erratic operation of other vehicles; questionable or abnormal driving behavior of other drivers; irresponsible or overly aggressive drivers; un-attentive or tired drivers; EMS vehicle route interfering with non-emergency vehicle route, etc.), the telematics (and/or data) data collected may indicate such.

The mobile device itself may be configured to identify the type of traffic event and transmit the type of traffic event to other mobile devices, a remote server, smart vehicles, and/or an infrastructure component. In one embodiment, the mobile device may be in wireless communication with a smart vehicle control system of the vehicle and/or a smart EMS vehicle controller or control system of the EMS vehicle, and the smart vehicle control system and/or smart EMS vehicle controller or control system may transmit the telematics and/or other data, and/or any associated warnings, to a remote server, and/or roadside smart infrastructure or nearby mobile devices or vehicles of other drivers (such as to conserve battery power of the mobile device).

Additionally or alternatively, the mobile device may transmit the telematics and/or other data collected via wireless communication and/or data transmission to a second computing device—such as a second mobile device (of another driver), a second and smart vehicle, a remote server, and/or road side infrastructure (smart street signs or road posts, smart toll booths, smart traffic lights, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, re-route vehicles, and/or direct vehicles to pull over. For instance, the second computing device may cause a display screen or user interface of a mobile device or smart vehicle controller of remote drivers to display a map with (1) a current route that the vehicle is on, (2) a virtual representation of the traffic event (e.g., EMS vehicle approaching), (3) an alternate or recommended new route to an original destination that avoids the EMS vehicle, and/or (4) a direction to pull over to a side of a road on the current route to allow the EMS vehicle to pass.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108 (e.g., a non-emergency vehicle). Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

In some aspects, telematics collection (e.g., one or more features of telematics collection system 100) may additionally or alternatively be implemented with respect to an EMS vehicle, such as EMS vehicle 210 discussed below with respect to FIG. 2. Thus, an EMS vehicle may include any one or more suitable features of telematics collection system 100 as described herein with respect to vehicle 108 so as to, for example, measure, calculate, generate, and/or collect geographic location data and/or telematics data indicative of speed, direction, and/or motion of the EMS vehicle.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device (e.g., smartphone, tablet, laptop, wearable electronics, phablet, pager, personal digital assistant (PDA), smart glasses, smart watch or bracelet, etc.), while on-board computer 114 may be implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
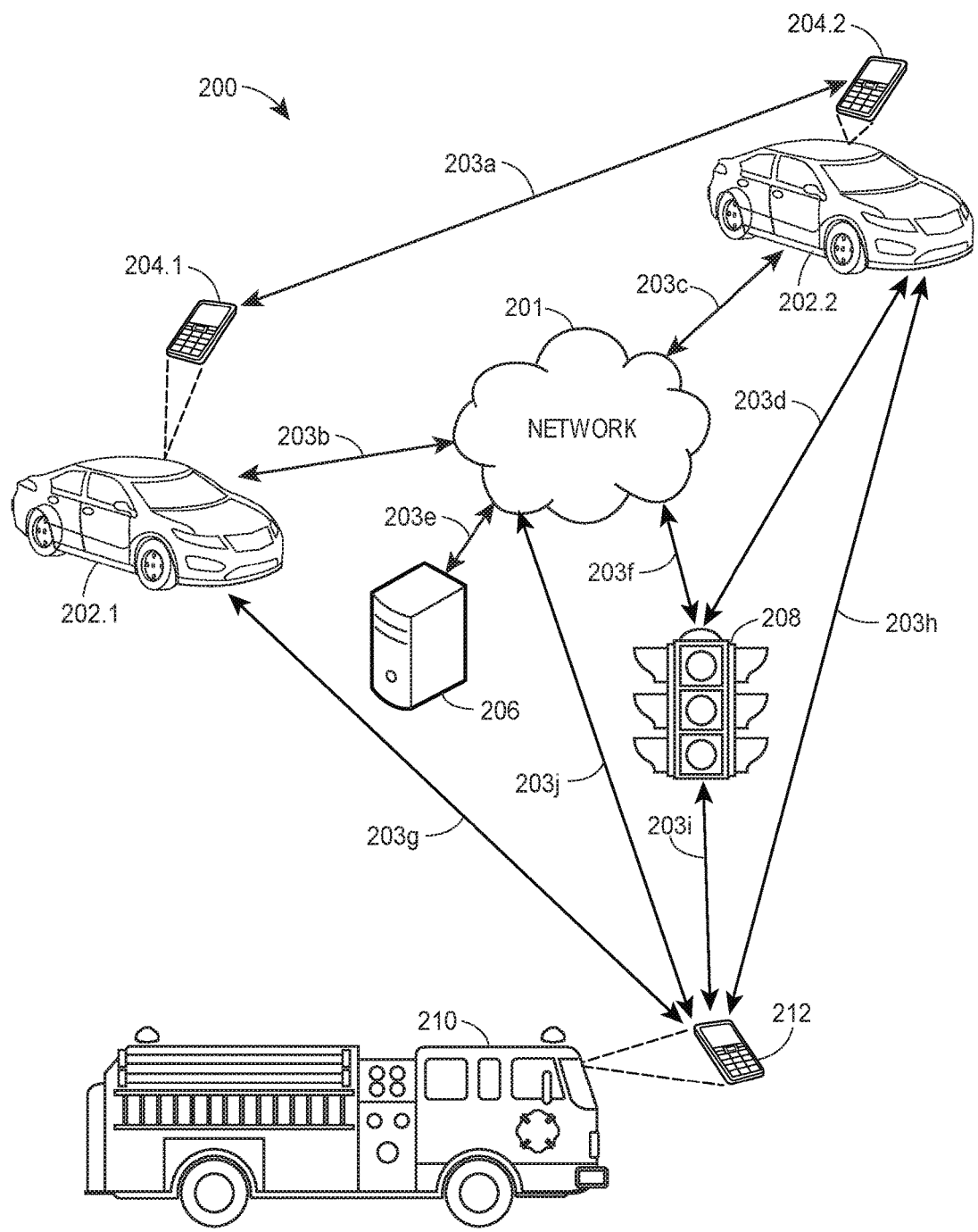
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, an infrastructure component 208, and/or an EMS vehicle 210. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Additionally or alternatively, the EMS vehicle 210 may have an associated mobile computing device 212 (e.g., within EMS vehicle 210), which may be an implementation of mobile computing device 110, and/or an associated on-board computer (not shown in FIG. 2), which may be an implementation of on-board computer 114. Each of vehicles 202.1 and 202.2 may be configured for wireless inter-vehicle communication and/or communication with one or more of mobile computing devices 204.1-204.N, external computing device 206, infrastructure component 208, EMS vehicle 210, and/or mobile computing device 212. Aspects include each of vehicles 202.1 and 202.2 being configured to perform communications in any suitable manner, such as via vehicle-to-vehicle (V2V) wireless communication and/or other suitable data transmission.

Although alert notification system 200 is shown in FIG. 2 as including one network 201, two mobile computing devices 204.1 and 204.2, two vehicles 202.1 and 202.2, one external computing device 206, one infrastructure component 208, one EMS vehicle 210, and/or one mobile computing device 212, various aspects include alert notification system 200 implementing any suitable number of networks 201, mobile computing devices 204, vehicles 202, external computing devices 206, infrastructure components 208, EMS vehicles 210, and/or mobile computing devices 212. For example, alert notification system 200 may include a plurality of external computing devices 206 and more than two mobile computing devices 204, any suitable number of which being interconnected directly to one another and/or via network 201.

In one aspect, each of mobile computing devices 204.1, 204.2, and 212 may be configured to communicate with one another and/or any suitable device directly via peer-to-peer (P2P) wireless communication and/or data transfer. In other aspects, each of mobile computing devices 204.1, 204.2, and 212 may be configured to communicate indirectly with one another and/or any suitable device via communications over network 201, such as external computing device 206, infrastructure component 208, and/or EMS vehicle 210, for example. In still other aspects, each of mobile computing devices 204.1, 204.2, and 212 may be configured to communicate directly and indirectly with one another and/or any suitable device, which may be via concurrent communications or communications occurring at separate times.

Each of mobile computing devices 204.1, 204.2, and 212 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.2, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

To provide still further examples, mobile computing device 212 may be configured to communicate with mobile computing device 204.1 via a direct radio link 203g; mobile computing device 212 may be configured to communicate with mobile computing device 204.2 via a direct radio link 203h; mobile computing device 212 may be configured to communicate with infrastructure component 208 via a direct radio link 203i; and mobile computing device 212 may be configured to communicate with network 201 via a radio link 203j so as to allow mobile computing device 212 to communicate indirectly with any suitable component in communication with network 201.

Mobile computing devices 204.1, 204.2, and 212 may be configured to execute one or more algorithms, programs, applications, etc., to determine a geographic location of each respective mobile computing device (and thus their associated vehicle or EMS vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1, 204.2, and/or 212 and one or more of external computing device 206, smart infrastructure component 208, or EMS vehicle 210. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure electronic communication network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203j may represent wired links, wireless links, or any suitable combination thereof.

In aspects in which mobile computing devices 204.1, 204.2, and 212 communicate directly with one another in a peer-to-peer fashion, network 201 may be bypassed and thus communications between mobile computing devices 204.1, 204.2, and 212 and external computing device 206 may be unnecessary. For example, in some aspects, mobile computing device 204.1 or mobile computing device 212 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1, 204.2, and/or 212 may work in conjunction with external computing device 206 to generate alerts. For example, in some aspects, mobile computing device 204.1 or mobile computing device 212 may broadcast geographic location data and/or telematics data, which is received by external computing device 206. In this case, external computing device 206 may be configured to determine whether an alert should be sent to mobile computing device 204.2 based upon the geographic location data and the telematics data.

To provide an example, mobile computing device 204.1 or mobile computing device 212 may broadcast telematics data, which is received by mobile computing device 204.2 and/or vehicle 202.2. Upon receipt of the telematics data, mobile computing device 204.2 and/or vehicle 202.2 may determine that an abnormal traffic condition (e.g., EMS vehicle route will interfere with route of another (e.g., non-emergency) vehicle) exists at the location of the originating vehicle (e.g., the location of mobile computing device 212 and EMS vehicle 210) and/or whether this location is along a route travelled by vehicle 202.2 or is otherwise relevant to vehicle 202.2.

Once this is determined, mobile computing device 204.2 and/or vehicle 202.2 may automatically take a preventive or corrective action, which may include, for example, mobile computing device 204.2 and/or vehicle 202.2 generating or determining an alert, issuing a visual alert, providing an audio or audible alert (e.g., an alert to pull over to a side of a road on a current route being traveled by vehicle 202.2), identifying an alternate travel route that avoids the route of the EMS vehicle or other abnormal traffic condition, presenting an alternative travel route on a display or display screen for use by a driver of vehicle 202.2, providing audio driving directions for the driver of vehicle 202.2 to travel along the alternate route, etc.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, a central monitoring system and/or dispatching center computer used by emergency response personnel, a railway monitoring system, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1, 204.2, and/or 212. For example, mobile computing device 204.1, 204.2, and/or 212 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to, for example, one or more of mobile computing devices 204.1 and/or 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data or other data from one or more mobile computing devices 204.1-204.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N may include logon credentials which may be verified by external computing device 206 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 204.1-204.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIG. 3, the one or more mobile computing devices 204.1-204.N may broadcast, in addition to or as part of the telematics data, data indicative of whether a Telematics App has been installed and/or usage data indicative of how often a driver uses the Telematics App functionality while driving. Of course, similar or identical data may be received from a vehicle as opposed to the mobile computing device located in the vehicle. That is, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, as noted above, an insurer may adjust insurance premiums, rates, discounts, points, programs, etc., based upon the insured having the functionality discussed herein and/or the amount that the insured uses the functionality discussed herein. It should be appreciated that generation, adjustment, updating, and/or calculating, etc., various insurance pricing may be performed by the insurer with respect to policies for autonomous and/or semi-autonomous vehicles, based upon the autonomous and/or semi-autonomous vehicles having the functionality discussed herein and/or the amount that such functionality is used.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage (which, it should be appreciated, may include usage by way of usage within an autonomous vehicle) of the Telematics App while driving.

In some aspects, external computing device 206 may facilitate indirect communications between one or more of mobile computing devices 204.1-204.2, vehicles 202.1-202.N, infrastructure component 208, EMS vehicle 210, and/or mobile computing device 212 via network 201 or another suitable communication network and/or wireless link. For example, external computing device 206 may receive telematics data from an originating mobile computing device 204.1 via radio link 203*b* and relay the telematics data to a destination mobile computing device 204.2 and/or to vehicle 202.2 via radio link 203*c*.

With respect to FIG. 2, infrastructure component 208 may be implemented as any suitable type of traffic infrastructure component configured to receive communications from and/or to send communications to other devices, such as mobile computing devices 204.1, 204.2, and/or 212, and/or external computing device 206, for example.

In some aspects, as noted herein, infrastructure component 208 may be implemented as one or more "smart" infrastructure components, which may be configured to communicate with one or more other devices directly and/or indirectly.

For example, smart infrastructure component 208 may be configured to communicate with one or more devices directly or indirectly. For example, smart infrastructure component 208 may be configured to communicate directly with mobile computing device 204.2 via link 203.*d* and/or with mobile computing device 204.1 via links 203*b* and 203*f* utilizing network 201. To provide another example, smart infrastructure component 208 may communicate with external computing device 206 via links 203*e* and 203*f* utilizing network 201.

Smart infrastructure component 208 may be implemented as any suitable type of traffic infrastructure component configured to receive communications from and/or send communications to other devices, such as mobile computing devices 204.1, 204.2, and/or 212, and/or external computing device 206, for example. For example, smart infrastructure component 208 may be implemented as a traffic light, a railroad crossing light, a construction notification sign, a roadside display configured to display messages, a billboard display, etc.

Similar to external computing device 206, one or more smart infrastructure components 208 may facilitate indirect communications between one or more of mobile computing devices 204.1-204.2, vehicles 202.1-202.N, external computing device 206, EMS vehicle 210, and/or mobile computing device 212 via network 201 or another suitable communication network and/or wireless link. For example, one or more smart infrastructure components 208 may receive telematics data from an originating mobile computing device 204.2 via radio link 203d and relay the telematics data to a destination mobile computing device 204.1 and/or to vehicle 202.1 via radio links 203b and 203f.

When implemented as a traffic light, smart infrastructure component 208 may be configured to detect when an EMS vehicle (e.g., EMS vehicle 210) is approaching a traffic light in any suitable manner. For example, this may be accomplished via the receipt, processing, and/or analysis of EMS vehicle telematics data that is transmitted by a mobile device located in or otherwise associated with an EMS vehicle and/or a dedicated device that is located in or otherwise associated with the EMS vehicle.

As explained above with respect to the telematics data corresponding to a vehicle, EMS vehicle telematics data may include metrics that indicate, for example, the EMS vehicle's current geographic location, speed, heading, motion, etc. In various aspects, the EMS vehicle telematics data may be collected by a dedicated device located on the EMS vehicle and/or a mobile device located on the EMS vehicle, similar to the telematics collection process discussed herein with respect to the vehicle telematics data collected via mobile computing devices 204.1-204.N.

To provide a more particular example, in one aspect, the EMS vehicle telematics data may include at least one of a timestamp, one or more sensor metrics indicative of braking motion of EMS vehicle 210, one or more sensor metrics indicative of acceleration motion of EMS vehicle 210, one or more sensor metrics indicative of cornering motion of EMS vehicle 210, or one or more sensor metrics indicative of a direction of EMS vehicle 210.

In another aspect, the EMS vehicle telematics data may additionally or alternatively include at least one of speed, acceleration, deceleration, GPS (Global Positioning System) coordinates (at times referred to herein as "GPS location"), or lane data associated with EMS vehicle 210. In yet another aspect, the EMS vehicle telematics data may additionally or alternatively include at least one of time, braking, acceleration, left turn, right turn, heading, GPS speed, GPS latitude and longitude, gyroscope, battery level, or telephone usage data associated with EMS vehicle 210. It should be appreciated that some of the EMS vehicle telematics data associated with EMS vehicle 210 may be associated with EMS vehicle 210 but be data that is collected and/or gathered from one or more other devices and/or vehicles. For instance, telephone usage data associated with EMS vehicle 210 may be telephone usage data of a mobile computing device in a (non-emergency) vehicle, such as telephone usage data of mobile computing device 204.1 in vehicle 202.1.

In some aspects, smart infrastructure component 208 may be configured to receive geographic location data and/or telematics data from one or more other devices and to process this data to determine whether an anomalous condition has been detected and whether the detected anomalous condition satisfies a threshold distance condition with respect to smart infrastructure component 208. The threshold distance condition may include, for example, the geographic location of the anomalous condition being within a threshold radius of smart infrastructure component 208, on the same road or a road that intersects with the same road serviced by smart infrastructure component 208, etc. If so, smart infrastructure component 208 may perform one or more relevant actions such as displaying a blinking light to warn of an oncoming EMS vehicle, displaying one or more relevant messages to notify drivers in the vicinity, to modify traffic patterns, to change traffic light timing, to redirect traffic, etc.

In other aspects, smart infrastructure component 208 may receive data indicating that an alert is to be generated and/or the type of alert that is to be generated. In accordance with such aspects, one or more of mobile computing devices 204.1, 204.2 and/or external computing device 206, for example, may make the determination of whether an anomalous condition exists and is within a threshold distance of smart infrastructure component 208. If so, the data received by smart infrastructure component 208 may be indicative of the type of anomalous condition, the location of the anomalous condition, commands to cause smart infrastructure component 208 to perform one or more acts, the type of acts to perform, etc.

To provide some illustrative examples, EMS vehicle 210 may be dispatched to the scene of an accident or other emergency. In such a case, EMS vehicle 210 may be configured to broadcast one or more signals that cause one or more of mobile computing devices 204.1-204.2 to generate one or more alert notifications and/or smart infrastructure component 208 to change to a different state. For instance, if smart infrastructure component 208 is implemented as a smart traffic light, smart infrastructure component 208 may change a traffic light from green to red (or vice-versa) or adjust a timing cycle to favor traffic in one direction over another. These signals may be broadcasted from a mobile computing device (e.g., mobile computing device 212) carried by emergency response personnel and triggered upon EMS vehicle 210 approaching (e.g., within a threshold distance of) a geographic location associated the accident or other emergency. Additionally or alternatively, the signals may be broadcasted by any suitable device mounted in or otherwise associated with EMS vehicle 210.

To provide another example, a train may broadcast one or more signals indicating that the train is approaching a railroad crossing, which may be received by one or more of mobile computing devices 204.1-204.2 and/or smart infrastructure component 208 and may result in the mobile computing devices generating one or more alert notifications and/or smart infrastructure component 208 changing to a different state. The broadcasted signal may be transmitted upon the train approaching (e.g., within a threshold distance of) the crossing location, and may be transmitted from a mobile computing device and/or equipment mounted on or otherwise associated with the train.

To provide yet another example, if smart infrastructure component 208 is implemented as a traffic sign display, smart infrastructure component 208 may display a warning message that the anomalous condition (e.g., a traffic accident) has been detected ahead and/or on a specific road corresponding to the geographic location data.

The signals transmitted from EMS vehicle 210 and/or additional vehicles such as trains (trains not being illustrated in FIG. 2 for purposes of brevity) may be transmitted in accordance with any suitable communication protocol directly and/or indirectly to one or more mobile computing devices 204.1-204.2 and/or smart infrastructure component 208, for example. For example, the signals may be transmitted directly to smart infrastructure component 208, indirectly to one or more of mobile computing devices 204.1-204.2 via network 201 and/or external computing device 206, etc.

Exemplary End-User/Destination Devices

The following details regarding the determination of an anomalous condition are explained in this section with reference to computing device 300, which may be a mobile computing device or "mobile device" (e.g., smart phone, laptop, tablet, phablet, smart watch, wearable electronics, etc.). In the present aspect, computing device 300 may be implemented as any suitable computing device, such as a mobile computing device (e.g., mobile computing device 110, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., external computing device 206 or smart infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
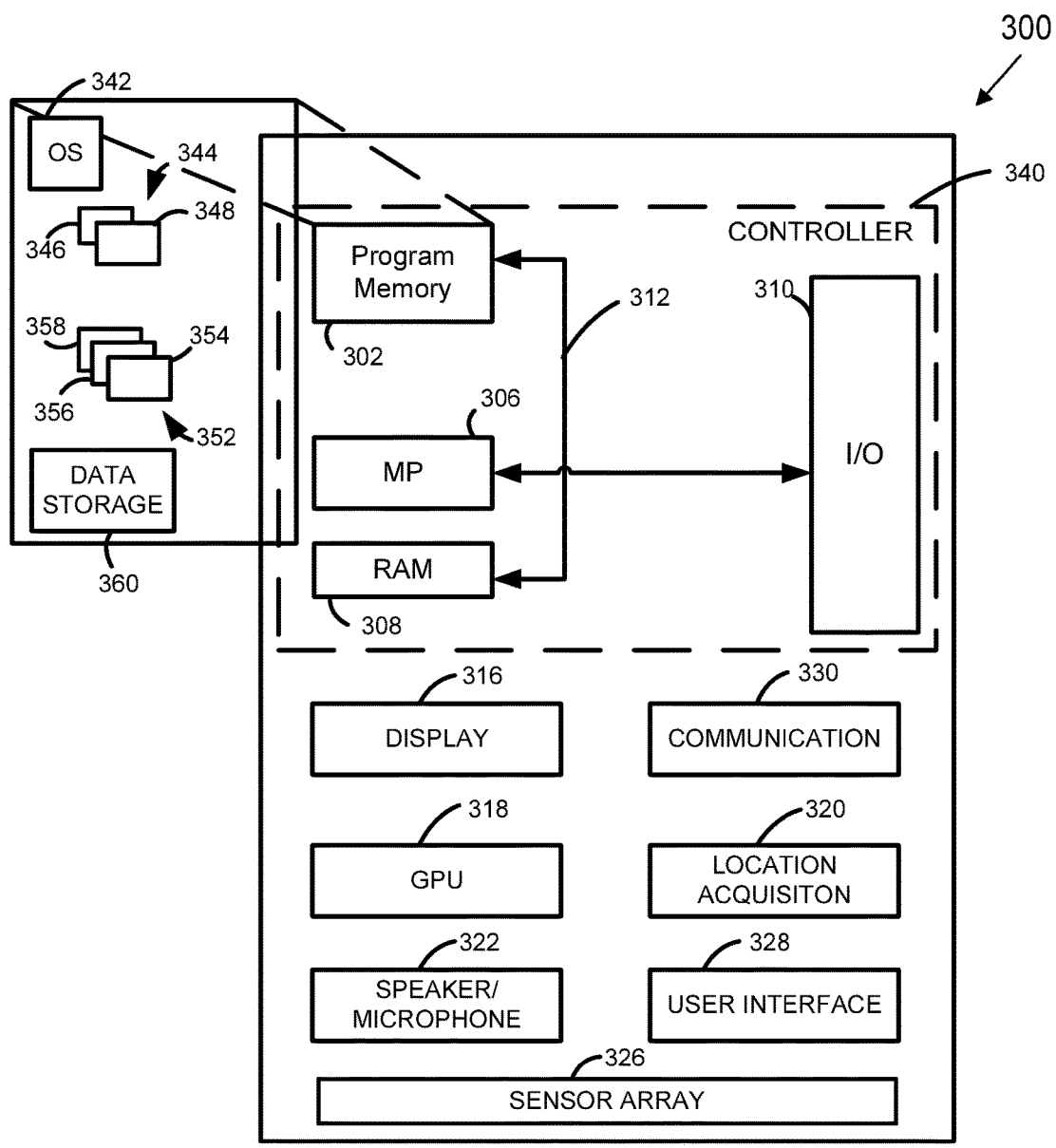
FIG. 3 illustrates a block diagram of an exemplary computing device 300 in accordance with an exemplary aspect of the present disclosure.

FIG. 3 illustrates a block diagram of an exemplary computing device or mobile device 300 in accordance with an exemplary aspect of the present disclosure. Computing device 300 may be implemented as any suitable computing device configured to (1) monitor, measure, generate, and/or collect telematics data; (2) broadcast the geographic location data and/or the telematics data to one or more external components, such as via wireless communication and/or data transmission; (3) receive geographic location data and/or telematics data broadcasted from another device, such as via wireless communication and/or data transmission; (4) determine whether an anomalous condition exists at or will exist at the geographic location indicated by the geographic location data based upon the telematics data (e.g., whether a route of an EMS vehicle to an emergency location will interfere with a current route of a non-emergency vehicle); (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 340 may be configured to communicate with additional data storage mechanisms that are not shown in FIG. 3 for purposes of brevity (e.g., one or more hard disk drives, optical storage drives, solid state storage devices, etc.) that reside within or are otherwise associated with computing device 300.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2 and/or mobile computing device 212), (iii) external computing devices (e.g., external computing device 206), (iv) vehicles (e.g., vehicle 108), (v) vehicle on-board computers (e.g., on-board computer 114), (vi) infrastructure components (e.g., smart infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, smart infrastructure components, etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle or EMS vehicle in which it is carried (e.g., vehicle 108 or EMS vehicle 210) via BLUETOOTH communications.

Communication unit 330 may be configured to broadcast data and/or to receive data in accordance with any suitable communications schedule. For example, communication unit 330 may be configured to broadcast geographic location data and/or telematics data every 15 seconds, every 30 seconds, every minute, etc. As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle or in-EMS vehicle charger). To provide still another example, aspects include communication unit 330 being additionally or alternatively configured to only broadcast telematics data when communication unit 330 is connected to and/or communicating with a device identified as a vehicle (e.g., a non-emergency vehicle). This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle or EMS vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, direction, and/or any other suitable metric(s) (e.g., any other suitable metric(s) corresponding to one or more examples of EMS vehicle telematics data discussed above) associated with movements of computing device 300 and, thus, a vehicle (e.g., non-emergency vehicle) or EMS vehicle in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below. Generally speaking, any suitable metric(s) and/or other indications corresponding to one or more examples of EMS vehicle telematics data discussed herein may be measured, collected, and/or generated.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In one aspect, sensor array 326 may include one or more cameras or other image capture devices. In accordance with such aspects, the one or more cameras that are part of sensor array 326 may be mounted or otherwise positioned on computing device 300 such that, when computing device 300 (e.g., a mobile computing device) is docked, cradled, or otherwise mounted within a vehicle or EMS vehicle, images may be captured from this vantage point. For example, when computing device 300 is mounted within a vehicle, a camera implemented by sensor array 326 may function as a dashboard camera, capturing images and/or video data of various objects outside of the vehicle from this vantage point. Additionally or alternatively, computing device 300 may capture audio data with the image and/or video data via speaker/microphone 322.

In various aspects, computing device 300 may begin to capture data upon detecting that it has been placed in a cradle, and otherwise not capture data in such a manner. This detection may occur, for example, via one or more conditions being satisfied. For example, computing device 300 may utilize one or more sensors (e.g., an accelerometer that is part of sensor array 326) to determine that computing device 300 has changed orientation to horizontal (as is common when docked), that computing device 300 is communicating via BLUETOOTH with the vehicle or EMS vehicle, that the vehicle or EMS vehicle is moving above a threshold speed, etc. Aspects include any suitable number of conditions, upon being satisfied, triggering computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a g-force associated with vehicle or EMS vehicle braking, acceleration, and cornering at a rate of 15 Hz, 30 Hz, 60 Hz, etc., which may be the same sampling rate as one another or different sampling rates. To provide another example, sensor array 326 may be configured to implement one or more gyroscopes to improve the accuracy of the measured one or more sensor metrics and to determine whether computing device 300 is in use or stationary within a vehicle or EMS vehicle. To provide another example, sensor array 326 may implement a compass (magnetometer) to determine a direction or heading of a vehicle or EMS vehicle in which computing device 300 is located.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or smaller resolutions).

Additionally or alternatively, sensor array 326, location acquisition unit 320, and/or communication unit 330 may log or otherwise measure various metrics or other data that may be used by controller 340 to determine how often the functionality of the Telematics Application is being utilized when a vehicle or EMS vehicle is being driven. For example, sensor array 326 may log the time when telematics data is being collected, when the Telematics Application is running, and/or when the Telematics Application has been started. To provide additional examples, communication unit 330 may store data indicative of a BLUETOOTH connection status of computing device 300. To provide yet another example, location acquisition unit 320 may store and/or log the changes in geographic location of computing device 300 over time.

In various aspects, controller 340 may determine how often a driver (or, as should be appreciated, an insured having an autonomous or semi-autonomous vehicle, for example) uses the Telematics App based upon any suitable combination of the aforementioned data. For example, the BLUETOOTH connection status may be leveraged to determine whether computing device 300 is located in a vehicle. To provide another example, the changes in the geographic location data over time may be utilized to determine whether computing device 300 has exceeded a threshold speed for a threshold duration of time. In this way, a determination may be made whether computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90% of the miles driven are done so with the functionality of the Telematics App available to the driver/autonomous vehicle/semi-autonomous vehicle). As discussed above, this usage data may be sent to an insurer or other third party via a telematics data transmission or a separate transmission and used to set and/or adjust an insurance policy, premium, or discount for the insured customer.

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use. If computing device 300 is in use (e.g., when implemented as a mobile computing device) then the movement of computing device 300 within the vehicle or EMS vehicle may not truly represent the vehicle or EMS vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when computing device 300 is mounted in a vehicle or EMS vehicle, the camera may be configured to store images and/or video data of the road in front of the vehicle or EMS vehicle in which it is mounted, and to store this data to any suitable portion of program memory 302 (e.g., data storage 360). Controller 340 and/or MP 306 may analyze this data to generate one or more local alerts, to transmit signals indicative of detected alerts to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In one aspect, alert notification application 346 may function as a Telematics Application (or "App") which is downloaded and installed on computing device (or mobile device) 300 by a user via a suitable third-party software store and/or portal (e.g., Apple iTunes, Google Play, the Windows Store, etc.).

To provide an illustrative example, software applications 344 may include instructions for performing tasks such as determining a geographic location of computing device 300 (e.g., via communications with location acquisition unit 320), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

Software applications 344 may include a web browser 348. In some embodiments (e.g., when computing device 300 is implemented as a mobile computing device), web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 206, as shown in FIG. 2). This web page information may be utilized in conjunction with alert notification application 346 to perform one or more functions of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data (e.g., EMS vehicle telematics data such as the EMS vehicle telematics data described in greater detail herein). In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one aspect, telematics collection routine 354 may work in conjunction with controller 340 and/or alert notification application 346 to periodically listen for and/or to periodically broadcast telematics data. For example, controller 340 may, upon executing alert notification application 346, periodically listen for a broadcast containing telematics data generated and transmitted from other computing devices, vehicles, EMS vehicles, external computing devices, and/or smart infrastructure components. Upon detecting a broadcast, controller 340 may download the broadcast to a suitable portion of program memory 302 and analyze the telematics data contained therein for potential traffic events, travel events, interference of a route(s) of an EMS vehicle(s) with a current route(s) of a non-emergency vehicle(s), alerts, messages, etc. Such aspects may be particularly useful, for example, to save battery life of the computing device, as continuous listening is not necessary but instead may be performed, for example, in accordance with a particular timing schedule.

To provide another example, controller 340 may, upon executing alert notification application 346, periodically broadcast telematics data, which may be received by other computing devices, vehicles, EMS vehicles, external computing devices, and/or smart infrastructure components.

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates of an EMS vehicle (e.g., EMS vehicle 210)). In some aspects, geographic location determination routine 356 may facilitate generating and/or storing geographic location data locally via one or more components of computing device 300 (e.g., via location acquisition unit 320 and/or communication unit 330). In some aspects, geographic location determination routine 356 may additionally or alternatively facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists (e.g., whether a route of an EMS vehicle to a location of an emergency will interfere with a current route of a non-emergency vehicle) based upon the telematics data, the geographic location data, and/or image and/or video data captured by one or more cameras or other imaging devices. An anomalous condition may include any suitable condition that indicates a deviation from normal traffic patterns, including the ability of a vehicle(s) to continue along a current route unimpeded by travel of an EMS vehicle(s) (e.g., without collision with an EMS vehicle(s) and/or without having to pull over to a side of a road on the current route, etc.). As another example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. In an aspect where determining whether an anomalous condition exists includes determining whether a route of an EMS vehicle will interfere with a route of a non-emergency vehicle, the speed of computing device 300 may be or may be included within the EMS vehicle telematics data. Furthermore, because each vehicle and/or EMS vehicle may sample and/or broadcast geographic location data and/or telematics data in real time, the anomalous conditions may be detected with minimal delay as they occur.

Although the speed of the vehicle and/or EMS vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon an EMS vehicle, mobile computing device 212 (which may be an implementation of computing device 300) may determine that a geographic location of EMS vehicle 210 is or will be within a predetermined or threshold distance of smart infrastructure component 208 implemented as a traffic light (e.g., a smart traffic light). Mobile computing device 212 may, upon execution of anomalous condition detection routine 358, conclude that EMS vehicle 210 will approach and/or pass through an intersection (e.g., an intersection at which the smart traffic light is situated) at a particular time based upon, for example, speed, acceleration, and/or any other suitable metrics and/or data that may be included in the EMS vehicle telematics data as discussed herein. Before, after, and/or concurrently with determining that EMS vehicle 210 will approach and/or pass through the intersection at a particular time, mobile computing device 212 may, upon execution of anomalous condition detection routine 358, determine that a current route of the non-emergency vehicle will cause the non-emergency vehicle to approach and/or pass through the intersection such that the current route of the non-emergency vehicle will interfere with the route of EMS vehicle 210 (e.g., cause a collision within or near the intersection). This determination may be based upon, for example, geographic location data and/or telematics data from (e.g., broadcast from) the non-emergency vehicle or a computing device (e.g., mobile computing device 204.1 and/or mobile computing device 204.2) associated with the non-emergency vehicle.

In another aspect, based upon geographic location data and/or telematics data from (e.g., broadcast from) a non-emergency vehicle, and/or upon execution of anomalous condition detection routine 358, mobile computing device 212 may determine that a geographic location of EMS vehicle 210 is otherwise within, or will otherwise be within, a predetermined or threshold distance of the non-emergency vehicle. More specifically, for instance, upon execution of anomalous condition detection routine 358, mobile computing device 212 may determine that a current route of a non-emergency vehicle will interfere with the route of EMS vehicle 210. This determination that the routes will interfere may be a determination that the routes will interfere, for example, because EMS vehicle 210 will pass the non-emergency vehicle along the current route of the non-emergency vehicle. It may further be determined that the non-emergency vehicle needs to pull over to a side of a road because there is insufficient time for the non-emergency vehicle to take an alternate route. Upon detecting the anomalous condition (e.g., that the routes will interfere), alert notification application 346 may broadcast a notification indicating the detected anomalous condition, the telematics data, and/or the geographic location data associated with the detected anomalous condition.

One or more vehicles (e.g., vehicle 202.1 and/or vehicle 202.2) may be equipped with additional computing devices 300 (e.g., implemented as mobile computing device 204.1 and/or mobile computing device 204.2), and may receive this data and determine whether the anomalous condition is relevant to the respective vehicle(s) based upon, for example, the geographic relationship between the vehicle(s) and EMS vehicle 210, and/or based upon other EMS vehicle telematics data. If the anomalous condition is relevant, then mobile computing device 204.1 and/or mobile computing device 204.2, for example, may generate an alert(s) indicating the anomalous condition. For instance, the alert(s) may include directing the driver(s) of the respective vehicle(s) and/or directing the respective autonomous vehicle(s) to travel along an alternate route(s), to pull over to a side of a road on a current route, etc.

In another aspect, the notification indicating the detected anomalous condition may not be broadcast, and mobile computing device 204.1 and/or 204.2, for example, may receive the telematics data and/or the geographic location data and determine whether an anomalous condition exists that is relevant to the respective vehicle(s) based upon this received data. If the anomalous condition is relevant, then mobile computing device 204.1 and/or mobile computing device 204.2, for example, may generate an alert as described above. It should be appreciated that in the foregoing examples directed to an EMS vehicle route interfering with a non-emergency vehicle route, EMS vehicle telematics data may be received, for instance, directly from an EMS vehicle transceiver (which may be a transceiver of mobile computing device 212, a transceiver of a dedicated device that is located in or otherwise associated with EMS vehicle 210 and that transmits EMS vehicle telematics data, etc.) or indirectly from a smart traffic light. As noted above, the smart traffic light may be an implementation of smart infrastructure component 208.

To provide an illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50%, of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate relevant action if an anomalous condition is found (e.g., issue an alert notification, generate an alert, display a warning message, etc.).

To provide yet another example by further modifying the details in the previous two and including aspects of the examples relating to a route of an EMS vehicle interfering with a route of a non-emergency vehicle, aspects may include first computing device 300 associated with a vehicle or EMS vehicle broadcasting the telematics data and geographic location data to an external computing device (e.g., to external computing device 206 via network 201, as shown in FIG. 2). In addition, the second computing device 300 associated with the second vehicle (or a first (non-emergency) vehicle, in some instances where first computing device 300 is associated with an EMS vehicle) may likewise broadcast telematics data and geographic location data to the external computing device. In accordance with such aspects, the external computing device may determine whether an anomalous condition exists and is relevant to one or more of the first and/or second computing devices 300 based upon, for example, a geographic relationship between the first and second computing devices 300. When relevant, external computing device may be configured to send alert notifications to the first and/or second computing devices 300, which may include any suitable type of communications such as push notifications, a short messaging service (SMS) message, an email, a notification that used in conjunction with the OS running on each respective computing device 300, etc. Upon receiving the notification from the external computing device, the first and/or second computing device 300 may generate an alert indicating, for example, a description of the anomalous condition and/or its location.

The geographic relationship between two or more computing devices 300 may be utilized in several ways to determine the relevance of the anomalous condition. For instance, current speed, location, route, destination, and/or direction of travel of a first vehicle or an EMS vehicle (collecting and/or associated with the telematics data) may be individually or collectively compared with current speed, location, route, destination, and/or direction of travel of a first (non-emergency) vehicle or a second (non-emergency) vehicle traveling on the road. As one example of the geographic relationship and use of the EMS vehicle telematics data, an EMS vehicle location, current speed, and/or route, etc. may be compared with a first (non-emergency) vehicle location, current route, and/or destination, etc. to determine whether the first (non-emergency) vehicle should divert course, slow down, pull over to a side of a road, turn onto a different road and then pull over to a side of the different road, etc., to alleviate the risk of the EMS vehicle and the first (non-emergency) vehicle being involved in a collision.

As another example of the geographic relationship, a radius from one vehicle or an EMS vehicle, or a line-of-sight distance between vehicles or between an EMS vehicle and a (non-emergency) vehicle, may be utilized and compared to a threshold distance. For example, if computing device 300 is implemented as an external computing device and determines a line-of-sight distance between a first and second vehicle (or between a vehicle and an EMS vehicle) to be less than a threshold distance (e.g., a half mile, one mile, etc.), then the external computing device may issue an alert notification to both vehicles (or to the vehicle and EMS vehicle). In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, intersections impacted and/or anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which computing device 300 is mounted to act as a dashboard camera. In accordance with such aspects, anomalous condition detection routine 358 may include instructions, that when executed by controller 340, facilitate the analysis of the image and/or video data to detect one or more anomalous conditions (e.g., one or more approaching EMS vehicles) that may pose an immediate threat to the driver. These anomalous objects may also be identified as a travel or traffic event, as previously discussed. This analysis may be performed in accordance with any suitable object recognition and/or image analysis to detect images in the path of the vehicle, such as animals, pedestrians, other vehicles, EMS vehicles, potholes, etc.

Upon detecting an anomalous object, computing device 300 may issue the appropriate alert via display 316 and/or sound an alarm via speaker/microphone 322. Additionally or alternatively, computing device 300 may, upon detecting an anomaly, broadcast one or more signals via communication unit 330, which are received directly or indirectly by other computing devices. Again, these other computing devices may then generate alert notifications locally when close to the geographic location of computing device 300 where the signal was broadcasted. Aspects in which the detected anomalous condition is shared in this manner may be particularly useful when the identified anomaly is likely to threaten other drivers using the same road, such as potholes or objects blocking the roadway, EMS vehicles, etc.

Although FIG. 3 depicts controller 340 as including one program memory 302, one MP 306, and one RAM 308, controller 340 may include any suitable number of each of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figure 4A:
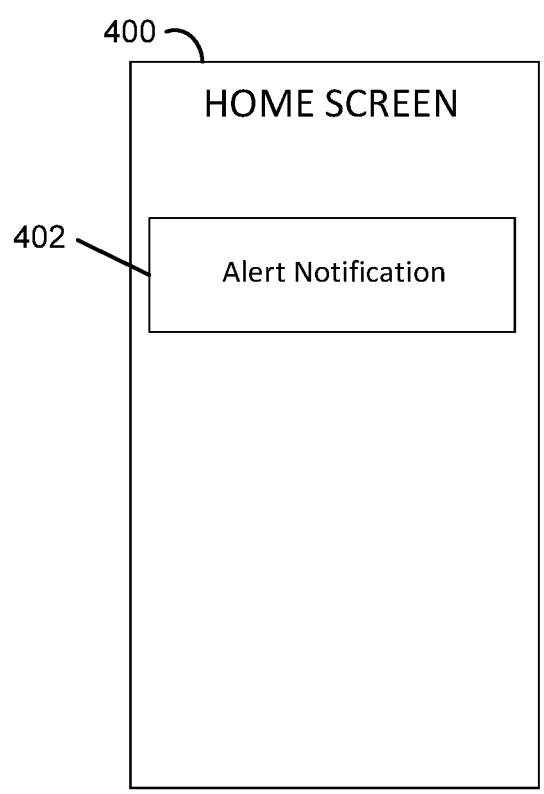
FIG. 4A illustrates an exemplary mobile computing device home screen 400 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or mobile computing devices 204.1, 204.2, and/or 212 as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

Figure 4B:
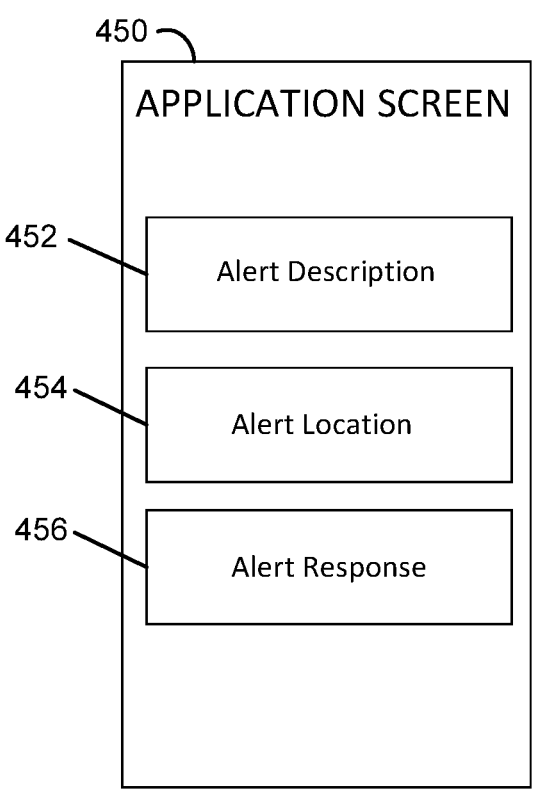
FIG. 4B illustrates an exemplary mobile computing device application screen 450 in accordance with an exemplary aspect of the present disclosure.

FIG. 4B illustrates an example mobile computing device application screen 450 in accordance with an exemplary aspect of the present disclosure. In various aspects, application screen 450 may be displayed on a mobile computing device, such as mobile computing device 110 or mobile computing devices 204.1, 204.2, and/or 212, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452, an alert location 454, and an alert response 456. Alert description 452 is a block diagram representation of one or more descriptions of the alerts related to the detected anomalous condition. Alert description 452 may be implemented as any suitable graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," "EMS vehicle approaching on cross street," etc.

Alert location 454 is a block diagram representation of one or more descriptions of the location of the anomalous condition. Alert location 454 may be implemented as any suitable graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, etc.

Alert response 456 is a block diagram representation of one or more descriptions of a directed response to the anomalous condition. Alert response 456 may be implemented as any suitable graphic, label, text, description, etc., to convey this to a user. For example, alert response 456 may include a text indication to "take alternate route" or "pull over to side of road," a map or other indication of an alternate route for a vehicle to take to avoid interfering with a route of an EMS vehicle, etc.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicles that are configured to receive telematics data associated with EMS vehicles, other vehicles and/or abnormal road or travel conditions that other drivers are experiencing. The telematics may be received directly from an EMS vehicle(s) or other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk-averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

Exemplary Smart Control Systems

Figure 5:
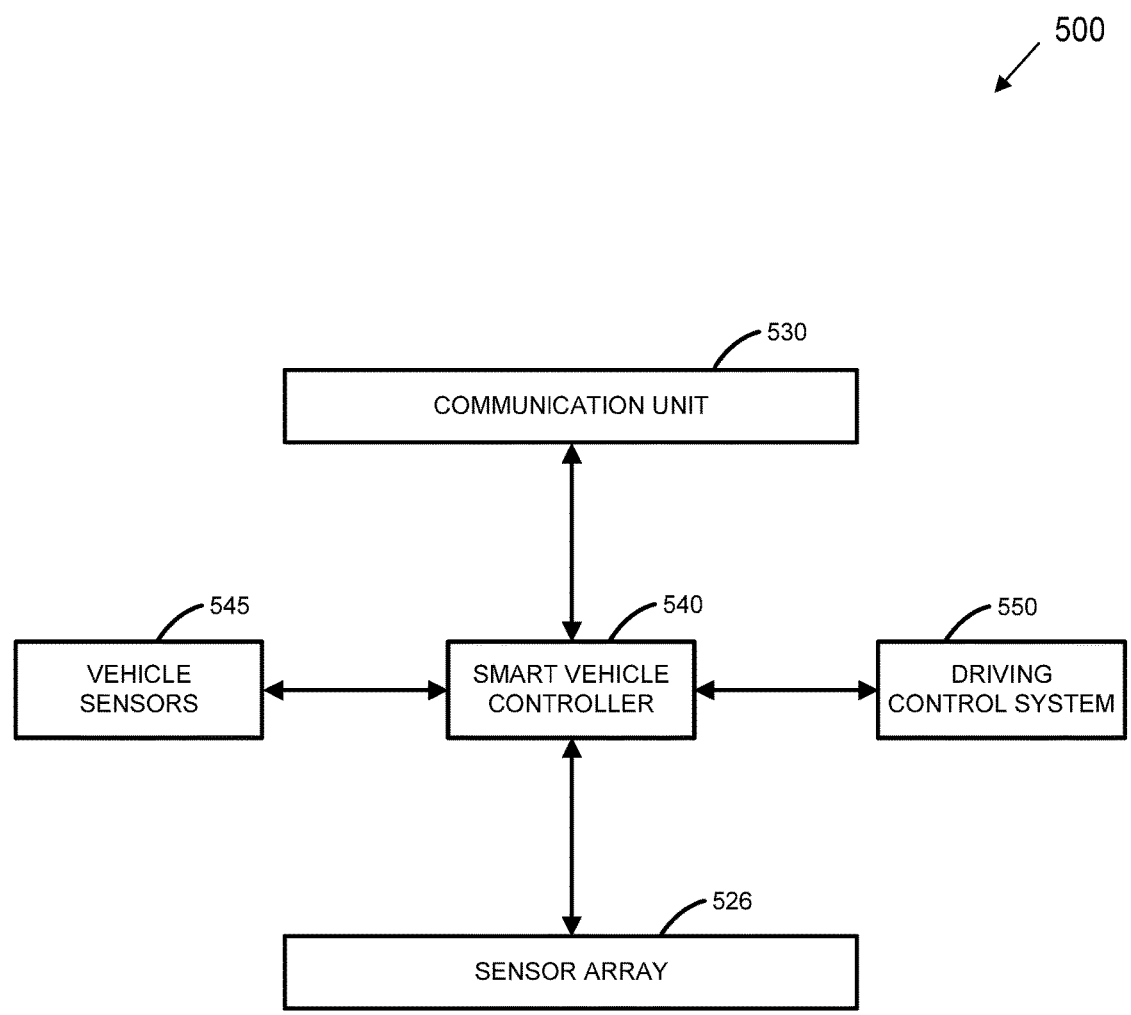
FIG. 5 illustrates a block diagram of an exemplary smart vehicle control system 500 in accordance with an exemplary aspect of the present disclosure.

FIG. 5 illustrates a block diagram of an exemplary smart vehicle control system 500 in accordance with an exemplary aspect of the present disclosure. In one aspect, smart vehicle control system 500 may be implemented as any suitable computing device, such as a computing device that is integrated as part of a smart vehicle to facilitate autonomous driving and/or other smart driving functions. For example, smart vehicle control system may be integrated as part of one or more vehicles 202.1-202.N, as shown in FIG. 2, to provide such vehicles with such functions. Smart driving functions may include, for example, the generation, receipt, collection, storage, and/or transmission of telematics data and/or other suitable data, such as previously discussed above with reference to on board computer 114, as shown in FIG. 1. Other suitable data may include other data discussed herein, such as, for example, geographic location data as discussed herein. In one aspect, a smart EMS vehicle controller or smart EMS vehicle control system may include similar features as smart vehicle control system 500 and may additionally or alternatively be integrated as part of an EMS vehicle (e.g., EMS vehicle 210), as further described below.

Smart vehicle control system 500 may include a sensor array 526, a communication unit 530, a smart vehicle controller 540, one or more vehicle sensors 545, and/or a driving control system 550, one or more of which may be configured to communicate with one another to receive data from, and send data to, one another. Smart vehicle control system 500 may include additional, less, or alternate functionality, including that discussed elsewhere herein, and/or discussed with reference to computing devices (e.g., mobile computing devices), remote servers, external computing devices, smart infrastructure, and/or EMS vehicles.

In one aspect, sensor array 526, communication unit 530, and smart vehicle controller 540 may have a similar architecture, implementation, and/or perform similar functions as sensor array 326, communication unit 330, and controller 340, respectively, as previously discussed above with reference to FIG. 3. Therefore, only differences between sensor array 526, communication unit 530, and smart vehicle controller 540, as shown in FIG. 5, and sensor array 326, communication unit 330, and controller 340, as shown in FIG. 3, will be further discussed herein.

For instance, it will be appreciated that some differences between sensor array 526, communication unit 530, and smart vehicle controller 540, as shown in FIG. 5, and sensor array 326, communication unit 330, and controller 340, as shown in FIG. 3, respectively, may be due to differences between applications and design requirements of computing devices and vehicles. For example, smart vehicle controller 540 may include one or more microprocessors, program memory, RAM, I/O interfaces, etc. However, smart vehicle controller 540 may include faster microprocessors, additional memory, faster memory controllers, etc., than that of controller 340 to account for the additional processing and speed requirements associated with the higher processing functions of vehicles, particularly smart vehicles. To provide another example, smart vehicle controller 540 may include one or more processors specifically designed for adaptive vision processing at high speeds and/or utilizing parallel processing techniques to facilitate autonomous or semi-autonomous driving.

Likewise, sensor array 526 may have additional or alternative sensors, meters, and/or other suitable devices as compared to sensor array 326. Sensor array 526 may additionally or alternatively include any suitable number and/or type of sensors, meters, and/or other suitable devices to facilitate autonomous or semi-autonomous driving. Examples of sensors included in sensor array 526 may include, for example, radar systems configured to operate at any suitable number or range of wavelengths (e.g., millimeter-wavelengths), Lidar, ultrasonic sensors, etc.

Vehicle sensors 545 may include, for example, any suitable number and/or type of sensors, meters, and/or other suitable devices integrated as part of the vehicle in which smart vehicle control system 500 is installed or otherwise implemented. For example, vehicle sensors 545 may generate one or more sensor metrics or other data that is part of the telematics data and/or other data that is stored, collected, and/or broadcasted from smart vehicle control system 500 (e.g., via communication unit 530).

In some aspects, vehicle sensors 545 may sample sensor metrics or other information that is included as part of the telematics data and/or other data, as discussed elsewhere herein, while sensor array 526 may be implemented as one or more sensors associated with autonomous driving functions. Thus, in aspects in which smart vehicle control system 500 is implemented as part of a non-autonomous vehicle, vehicle sensors 545 and sensor array 526 may be implemented as a single sensor array.

Communication unit 530 may be configured to transmit telematics data (and/or other suitable data) including one or more sensor metrics or other information generated by vehicle sensors 545 and/or sensor array 526, which may be received by other computing devices (e.g., mobile computing devices), other smart vehicles, smart infrastructure, external computing devices, and/or EMS vehicles, as discussed elsewhere herein. Additionally or alternatively, communication unit 530 may be configured to receive telematics data (and/or other suitable data) from other computing devices (e.g., mobile computing devices), other smart vehicles, smart infrastructure, external computing devices, and/or EMS vehicles, as discussed elsewhere herein.

When transmitting telematics data and/or other data discussed herein, smart vehicle controller 540 may be configured to format the sensor metrics and/or other information generated, collected, and/or measured by vehicle sensors 545 and/or sensor array 526 into a data broadcast, determine whether the telematics data and/or other data should be updated, and/or broadcast the telematics data and/or other data. Additionally or alternatively, smart vehicle controller 540 may be configured to analyze the telematics data and/or other data to identify one or more anomalous conditions (e.g. travel events, traffic events), and/or alerts, to generate one or more messages associated with the telematics data (and/or other data) and/or detailing the type and/or extent of an identified anomaly and/or alert, etc.

Furthermore, smart vehicle controller 540 may be configured to broadcast or otherwise direct a transmission of the message via data transmission and/or wireless communication (e.g., via communication unit 530) to another computing device (such as a mobile computing device, another vehicle, a remote server, smart infrastructure, etc.). As further discussed herein, devices receiving the message and/or the telematics data and/or other data may utilize such received information to perform various functions, issue alerts to drivers, etc. In this way, the messages, telematics data, and/or other data transmitted by smart vehicle control system 500 may facilitate safer travel for another vehicle and/or another driver.

Similar to the other devices described above (e.g., mobile computing device 300), when receiving data, smart vehicle controller 540 may be configured to perform various functions such as issuing alerts to drivers when the data contains a warning message and/or identifying an anomalous condition by analyzing the received data.

Driving control system 550 may be implemented with any suitable number and/or type of driving controllers to control the direction, movement, and/or speed of the vehicle in which smart vehicle control system 500 is installed. For example, driving control system 550 may include various drive-by-wire interfaces to facilitate controlling the speed of the vehicle and to turn the vehicle without user input. To provide an additional example, driving control system may include various braking controllers and/or transmission controllers to slow the vehicle and to shift the vehicle into different gears.

In accordance with one aspect, smart vehicle controller 540 may communicate with one or more components of driving control system 550 in response to telematics data, information, and/or messages received via communication unit 530. For example, if the telematics data indicates a road hazard at a certain location and/or in a certain road lane, then smart vehicle controller 540 may issue one or more commands to driving control system 550 to steer the vehicle into a clear lane, thus avoiding the road hazard. As another example, if the telematics data and/or one or more messages indicate that an EMS vehicle is within a predetermined distance of, for instance, an intersection, then smart vehicle controller 540 may issue one or more commands to driving control system 550 to re-route or stop the vehicle.

Driving control system 550 may include different types of feedback components and/or control systems based upon the type of vehicle in which smart vehicle control system 500 is implemented or installed. For example, driving control system 550 may include various interfaces and/or control systems to facilitate autonomous driving in conjunction with smart vehicle controller 540. But if smart vehicle control system 500 is implemented in a non-autonomous vehicle, driving control system 550 may work in conjunction with smart vehicle controller 540 to receive one or more signals and/or data associated with traditional driving functions (e.g., manual acceleration, steering, braking, etc.).

Regardless of the type of vehicle in which smart vehicle control system 500 is implemented, smart vehicle controller 540 may work in conjunction with driving control system 550 to support any suitable number and/or types of driver feedback. To provide this feedback, driving control system 550 may include any suitable number and/or types of displays, user interfaces, speakers, buzzers, etc.

For example, driving control system 550 may include various feedback components to provide visual and/or auditory feedback regarding the operation of the vehicle and/or information regarding anomalous conditions, alerts, warnings, recommendations, etc., which may be based upon an analysis of telematics data and/or other suitable data. Again, the telematics data and/or other suitable data may be received from another computing device (e.g., via communication unit 530) and/or generated and analyzed locally at smart vehicle control system 500.

To provide another example, smart vehicle controller 540 may include one or more memory units configured to store cartographic and/or map data. In response to user input received via a user interface implemented by driving control system 550, smart vehicle controller 540 may generate, calculate, and/or display travel routes, which may provide navigational guidance to a driver. Furthermore, smart vehicle controller 540 may perform functions associated with the determination of whether an identified anomaly (e.g., a traffic event, travel event such as an approaching EMS vehicle, abnormal condition, etc.), which has been determined from an analysis of received telematics data from another device, is relevant to the vehicle in which smart vehicle control system 500 is implemented.

This determination of relevance may be made, for example, by comparing a location (e.g., geographic coordinates included in a telematics data transmission) to the current location of the vehicle in which smart vehicle control system 500 is implemented to determine whether the locations are within a threshold distance of one another. The determination may also be made, for example, when the identified anomaly or other abnormal condition is or will be (e.g., in the case of an approaching EMS vehicle) located along a current travel route (e.g., ahead by some threshold distance in a direction of travel on the same road on which the vehicle is moving). If so, aspects include smart vehicle controller 540 automatically performing various preventative and/or corrective actions based upon how the relevance of the identified anomaly is determined. For example, smart vehicle controller 540 may issue a visual and/or audible alert via driving control system 550, calculate and display a new travel route via driving control system 550 that avoids the location of the identified event, etc.

In some aspects, the preventative and/or corrective actions may be issued only when it is determined that an identified anomaly is relevant, and is otherwise not issued. For example, aspects include an identified anomaly that is not along a current route for the vehicle in which smart vehicle control system 500 is implemented not causing an alarm to be sounded and/or the route to be adjusted, even if the location of the anomaly is otherwise nearby. In this way, the preventive or corrective action may alleviate or avoid a negative impact of the abnormal travel condition on the driver and/or the vehicle in which smart vehicle control system 500 is implemented to facilitate safer or more efficient vehicle travel. Additional details of the preventive or corrective action that may be facilitated by smart vehicle control system 500 (or another suitable computing device or system) are further discussed below with reference to FIG. 6.

As noted above, in an aspect, a smart EMS vehicle controller or smart EMS vehicle control system may include similar features as smart vehicle control system 500 and may be integrated as part of an EMS vehicle (e.g., EMS vehicle 210). Thus, for instance, a smart EMS vehicle control system may include a smart EMS vehicle controller, EMS vehicle sensors, a communication unit, a sensor array, and/or an EMS vehicle driving/operation control system configured to perform functions similar to those discussed with reference to smart vehicle control system 500, but in the context of an EMS vehicle (e.g., EMS vehicle 210) and EMS vehicle telematics data and/or other suitable data as discussed herein.

Exemplary Emergency Vehicle Embodiments

Figure 6:
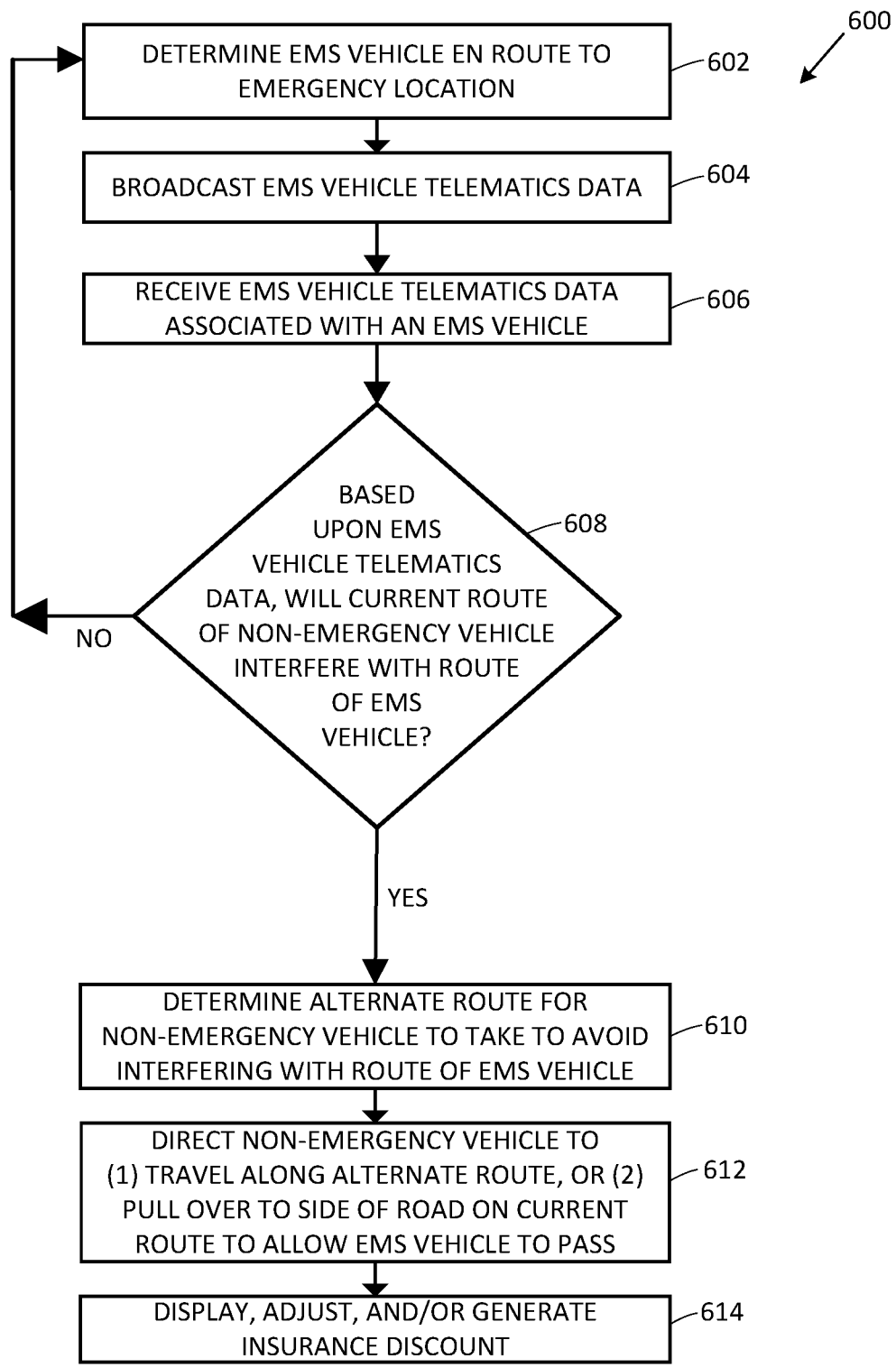
FIG. 6 illustrates an exemplary computer-implemented method 600 of using emergency response system (EMS) vehicle telematics data to reduce risk of accidents in accordance with an exemplary aspect of the present disclosure.

FIG. 6 illustrates an exemplary method 600 of using emergency response system (EMS) vehicle telematics data to reduce risk of accidents. In the present aspect, the method 600 may be implemented by any suitable computing device (e.g., mobile computing devices 204.1 and/or 204.2, mobile computing device 212, external computing device 206, vehicles 202.1 and/or 202.2 (which, as noted above, may be a non-emergency vehicle(s)), EMS vehicle 210, and/or infrastructure component 208, as shown in FIG. 2). In one aspect, the method 600 may be performed by one or more processors, applications, and/or routines, such as any suitable portion of controller 340, software applications 344, and/or software routines 352, for example, as shown in FIG. 3.

The method 600 may include determining that an emergency response system (EMS) vehicle is en route to an emergency location (block 602). For instance, with reference to FIG. 2, EMS vehicle 210 may have a processor or controller (e.g., smart EMS vehicle controller) that determines that EMS vehicle 210 is en route to an active emergency (block 602). Additionally or alternatively, a remote server or central dispatch processor may determine that EMS vehicle 210 is responding to an emergency (block 602). As discussed above, in various aspects, EMS vehicle 210 may be any suitable vehicle that is dispatched in the event of an emergency (block 602). For example, EMS vehicle 210 may include an ambulance, a police vehicle, a fire truck, etc. (block 602).

Thus, in some aspects, a mobile computing device (e.g., mobile computing device 212) may determine that EMS vehicle 210 is en route to an emergency location, while other aspects include this determination being made based upon various conditions, triggers, or other suitable data that is received and processed by an external computing device (block 602).

For example, mobile computing device 300 (of which mobile computing device 212, for example, may be an implementation) may execute alert notification application 346, as discussed above with reference to FIG. 3 (block 602). In accordance with aspects in which a mobile computing device located within an EMS vehicle determines whether the EMS vehicle is en route to an emergency location, one or more of alert notification application 346, telematics collection routine 354, geographic location determination routine 356, and/or anomalous condition detection routine 358 may include instructions that, when executed by controller 340, facilitate this determination (block 602).

In an aspect, alert notification application 346 may include different versions, instructions, executable code, etc., that is directed to different types of end users. For example, as discussed above with reference to FIG. 3, alert notification application 346 may facilitate alerts being generated via mobile computing device 300 when an anomalous condition is detected and/or the receipt and issuance of relevant alerts.

In accordance with some aspects, alert notification application 346 may include instructions that are directed to the use of mobile computing device 300 by emergency response personnel, or may allow a user to define the mode of operation via user interface 328. When running in emergency response personnel mode, aspects include mobile computing device 300 determining that the vehicle (e.g., EMS vehicle) in which it is located is en route to an emergency location based upon various conditions being satisfied (block 602).

For example, mobile computing device 300 may monitor the speed of the EMS vehicle in which it is located and, when the speed is greater than a threshold speed for a threshold duration of time, determine that the EMS vehicle is en route to an emergency location (block 602). To provide another example, mobile computing device 300 may monitor (e.g., as a background process) ambient sounds and compare these sounds to one or more profiles that match the frequency, intensity, and/or pattern of a siren emitted by an EMS vehicle while responding to an emergency (block 602). If such sounds are detected, aspects include mobile computing device 300 determining that the EMS vehicle is en route to an emergency location (block 602). To provide yet another example, a user (e.g., the driver) may select an option displayed via display 316 indicating that the EMS vehicle is responding and en route to an emergency location (block 602).

In other aspects, an external computing device may determine whether an EMS vehicle is en route to an emergency location (block 602). This may be accomplished, for example, by monitoring communications sent to and/or received from the EMS vehicle and/or a mobile computing device (e.g., mobile computing device 212) that is located in the EMS vehicle (e.g., EMS vehicle 210) (block 602). For example, external computing device 206, as previously discussed with reference to FIG. 2, may be utilized by or otherwise form part of a dispatching center, a centralized monitoring station, etc. (block 602). External computing device 206 may be used by one or more personnel who are aware of the present status of an EMS vehicle and whether the EMS vehicle is en route to an emergency location (block 602).

To provide another example, data sent by mobile computing device 300 while in the EMS vehicle and/or data sent by a dedicated device located in the EMS vehicle may be analyzed and processed by external computing device 206 with minimal or no user intervention to make this determination (block 602). To provide an illustrative example, external computing device 206 may analyze changes in the geographic location data transmitted by mobile computing device 300 over time to determine the speed of the EMS vehicle in which mobile computing device 300 is located (block 602). As discussed above, external computing device 206 may determine, when the speed of the EMS vehicle is greater than a threshold speed (e.g., 70 mph) for a threshold duration of time (e.g., 5 seconds, 10 seconds, etc.), that the EMS vehicle is en route to an emergency location (block 602). To provide another illustrative example, external computing device 206 may monitor the geographic location of the EMS vehicle to determine whether the EMS vehicle is within a threshold distance of a known emergency location, on a road approaching the emergency location within a threshold distance, etc. (block 602).

The method 600 may include broadcasting EMS vehicle telematics data (block 604). For instance, once it is determined that the EMS vehicle is responding to an active emergency and/or en route to an emergency location, telematics data and/or other data may be broadcast from an EMS vehicle transceiver located in the EMS vehicle, from mobile computing device 212, and/or from the external computing device (e.g., external computing device 206) (block 604). The EMS vehicle telematics data may include at least one of GPS location data, speed data, route data, heading data, acceleration data, or lane data associated with EMS vehicle 210 (block 604). In one aspect, the EMS vehicle telematics data may additionally or alternatively include destination data indicative of a destination of the EMS vehicle, where the destination may in some examples be at or near the emergency location (block 604).

In another aspect, the EMS vehicle telematics data may additionally or alternatively include at least one of a timestamp, one or more sensor metrics indicative of braking motion of EMS vehicle 210, one or more sensor metrics indicative of acceleration motion of EMS vehicle 210, one or more sensor metrics indicative of cornering motion of EMS vehicle 210, or one or more sensor metrics indicative of a direction of EMS vehicle 210 (block 604).

In yet another aspect, the EMS vehicle telematics data may additionally or alternatively include at least one of the speed data associated with EMS vehicle 210, the acceleration data associated with EMS vehicle 210, deceleration data associated with EMS vehicle 210, the GPS location data associated with EMS vehicle 210, or the lane data associated with EMS vehicle 210 (block 604).

In still another aspect, the EMS vehicle telematics data may additionally or alternatively include at least one of time data associated with EMS vehicle 210, braking data associated with EMS vehicle 210, left and/or right turn data associated with EMS vehicle 210, the heading data associated with EMS vehicle 210, GPS speed data associated with EMS vehicle 210, GPS latitude and longitude data associated with EMS vehicle 210, gyroscope data associated with EMS vehicle 210, battery level data associated with EMS vehicle 210, or telephone usage data associated with EMS vehicle 210 (block 604).

The method 600 may include receiving EMS vehicle telematics data associated with an EMS vehicle (e.g., the broadcasted EMS vehicle telematics data discussed above, which may be associated with EMS vehicle 210) when the EMS vehicle is en route to the emergency location (block 606). The EMS vehicle telematics data may be received via at least one of one or more vehicle processors (e.g., autonomous vehicle processors, it being understood that references with respect to FIG. 6 herein to "vehicle processors" may refer to autonomous vehicle processors or semi-autonomous vehicle processors of or associated with an autonomous or semi-autonomous vehicle, respectively) or one or more associated transceivers (block 606). Where the EMS vehicle telematics data is received via the one or more vehicle processors, the EMS vehicle telematics data may be received via one or more processors of, for example, mobile computing device 204.1 of vehicle 202.1; one or more processors of, for example, a smart vehicle controller of vehicle 202.1; etc. (block 606). Where the EMS vehicle telematics data is received via the one or more associated transceivers, the EMS vehicle telematics data may be received via one or more transceivers of, for example, mobile computing device 204.1 of vehicle 202.1; one or more transceivers of, for example, a smart vehicle controller of vehicle 202.1; etc. (block 606). The EMS vehicle telematics data may be received via wireless communication or data transmission, and may be received directly or indirectly from the EMS vehicle (e.g., directly from a transceiver of EMS vehicle 210, indirectly from external computing device 206, etc.) (block 606).

As noted above, in various aspects, examples of the EMS vehicle telematics data as described herein may be data of EMS vehicle 210 itself and/or data of another (e.g., non-emergency) vehicle (e.g., vehicle 202.1) (block 606). For instance, the aforementioned braking data, left and/or right turn data, heading data, GPS speed data, GPS latitude and longitude data, gyroscope data, battery level data, lane data, and telephone usage data, among other examples, may be data of EMS vehicle 210 itself and/or data of a non-emergency vehicle (block 606). It should be appreciated that when such data is data of a non-emergency vehicle, such data may be regarded as being associated with EMS vehicle 210 because of the relevance of such data in determining, for example, whether the non-emergency vehicle can safely drive along its current route without interfering with the route of EMS vehicle 210 to the emergency location, as further discussed below (block 606).

The broadcast of the EMS vehicle telematics data may be detected and/or received via a mobile device app, such as an app executed by mobile computing device 204.1 or mobile computing device 204.2, for example (block 606). The mobile device app may be a Telematics App (e.g., alert notification application 346), such as discussed elsewhere herein (block 606). The mobile device (e.g., mobile computing device 204.1 or mobile computing device 204.2) may listen for a telematics broadcast and, when detected, download or store the EMS vehicle telematics data received via a transceiver of the mobile device (block 606). The mobile device may be traveling within a moving vehicle (e.g., vehicle 202.1 or vehicle 202.2) (block 606).

For example, as discussed above with reference to FIG. 3, mobile computing device 300 may execute alert notification application 346. In an aspect, the execution of alert notification application 346 may facilitate mobile computing device 300 receiving (e.g., via communication unit 330) and/or detecting EMS vehicle telematics data (e.g., as a result of MP 306 processing data received by communication unit 330) and/or other suitable data (block 606). Such EMS vehicle telematics data and/or other suitable data may be transmitted by external computing device 206 (and/or a transceiver or other dedicated device that is located in or otherwise associated with EMS vehicle 210 (such as a transceiver of mobile computing device 212)) once it is determined that EMS vehicle 210 is en route to an emergency location (block 606).

The method 600 may include determining (e.g., via the one or more vehicle processors), based upon the EMS vehicle telematics data, whether a current route of a (non-emergency) vehicle (e.g., vehicle 202.1 or 202.2) will interfere with the route of EMS vehicle 210 to the emergency location (block 608). This determination may be based upon a comparison (e.g., via the one or more vehicle processors) of (1) the received EMS vehicle telematics data or a portion thereof with (2) at least one of (i) data indicative of at least one of a current GPS position, route, speed, heading, or destination, etc. of the non-emergency vehicle or (ii) at least one of a current time or a time that the current route of the non-emergency vehicle and the route of EMS vehicle 210 to the emergency location will at least one of overlap or intersect (block 608). The data indicative of the at least one of the current GPS position, route, speed, heading, or destination, etc. of the non-emergency vehicle may be geographic location data and/or other telematics data of the non-emergency vehicle, which may be determined as discussed above, such as by executing instructions of telematics collection routine 354 and/or geographic location determination routine 356 (block 608).

Moreover, the time that the current route of the non-emergency vehicle and the route of EMS vehicle 210 to the emergency location will overlap and/or intersect may be determined by determining a time that the non-emergency vehicle, while on its current route, will turn onto a road that intersects a road of the route traveled by EMS vehicle 210 or that overlaps a road of the route traveled by EMS vehicle 210 (block 608). For instance, the non-emergency vehicle may turn onto an overlapping road by turning onto a road that is the same as a road on the route traveled by EMS vehicle 210 (block 608).

In any event, suitable determinations may be made based upon, for example, one of the possible comparisons described with respect to present block 608 (e.g., by way of the anomalous condition detection routine 358) in order to determine whether the current route of the non-emergency vehicle and the route of EMS vehicle 210 will interfere (block 608).

For example, referring back to FIG. 2, vehicle 202.1, which may be associated with mobile computing device 204.1, may require emergency assistance. Thus, in this example, vehicle 202.1 may be located at the emergency location to which EMS vehicle 210 is en route. Continuing this example, vehicle 202.2, which may be associated with mobile computing device 204.2, may be driving on a road at a separate location from the emergency location of vehicle 202.1. Mobile computing device 204.2 may receive the EMS vehicle telematics data as discussed above, and alert notification application 346 may process the EMS vehicle telematics data to determine whether a current route of vehicle 202.2 should be changed to prevent interference with the route of EMS vehicle 210 (block 608).

If it is determined that the current route of the (non-emergency) vehicle will not interfere with the route of EMS vehicle 210, method 600 may revert to determining that an EMS vehicle is en route to an emergency location (block 602). If it is determined that the current route of the (non-emergency) vehicle will interfere with the route of EMS vehicle 210, method 600 may continue (block 610).

The method 600 may include determining (e.g., via the one or more vehicle processors) an alternate route for the non-emergency vehicle to take to avoid interfering with the route of EMS vehicle 210 to the emergency location (block 610). In some aspects, an alert may additionally or alternatively be generated (e.g., via mobile computing device 204.1 or mobile computing device 204.2) (block 610). For instance, the mobile device app may generate an alert and/or an alternate route for the non-emergency vehicle to take that avoids interfering with EMS vehicle 210 altogether (block 610). As an example, the mobile device may choose an alternate route that takes the non-emergency vehicle to its current destination but increases the distance that the route of the non-emergency vehicle comes within closest proximity to the destination of EMS vehicle 210, i.e., the location of the emergency (block 610).

To provide an illustrative example, the EMS vehicle telematics data may include route information that indicates that EMS vehicle 210 is on the same road currently occupied by vehicle 202.2. If so, alert notification application 346 may generate an alert indicating a direction in which EMS vehicle 210 is approaching and display this via display 316 (block 610). In this way, the driver of vehicle 202.2 (or vehicle 202.2 itself, in case of an autonomous vehicle, for example) may be provided with advance notice regarding when to pull over, whether to get off the road to make room for EMS vehicle 210, etc. (block 610). Moreover, because of the ability to use data such as the current speed of vehicle 202.2 (e.g., as described with respect to the comparisons above), telematics data of non-emergency vehicles (e.g., telematics data of vehicle 202.2) and/or telematics data received by non-emergency vehicles (e.g., the EMS vehicle telematics data received by vehicle 202.2) may be utilized to clear a route to an emergency location for EMS vehicle 210 (block 610). As such, EMS vehicle 210 may arrive at the emergency location in a more safe and efficient manner than would otherwise be possible (block 610).

The method 600 may include directing (e.g., via the one or more vehicle processors) a non-emergency vehicle (e.g., vehicle 202.2) to (1) travel along an alternate route, such as an alternate route as discussed above, or (2) pull over to a side of a road on a current route of the non-emergency vehicle to allow EMS vehicle 210 to pass unimpeded to facilitate safe travel for EMS vehicles (block 612). For instance, the non-emergency vehicle may be directed, such as via suitable output from mobile computing device 204.2, to pull over if EMS vehicle 210 is approaching from the rear of the non-emergency vehicle and there is insufficient time for the non-emergency vehicle to take an alternate route (block 612). In another example, the non-emergency vehicle may be directed to pull over if an alternate route would cause a travel time for the non-emergency vehicle to its destination to be longer than a travel time that would result from pulling over and allowing EMS vehicle 210 to pass (block 612).

The method 600 may include at least one of displaying, adjusting, or generating an insurance discount (and/or premium) for vehicles (e.g., autonomous vehicles) having risk mitigation or prevention functionality such as that described herein (block 614). For example, such functionality, as discussed above, may be functionality associated with receiving a wireless communication broadcast including the EMS vehicle telematics data, analyzing the EMS vehicle telematics data, and directing corrective actions based upon the EMS vehicle telematics data (block 614). The at least one of the displaying, adjusting, or generating an insurance discount (and/or premium) may be performed via, for example, the one or more vehicle processors and/or an insurance provider remote server (block 614). Moreover, such acts may be performed and results may be displayed or otherwise communicated via, for example, an insurance provider remote server and/or a mobile computing device, as also described hereinabove (block 614). In some aspects, the insurance discount may be time or mileage usage-based based upon an amount of usage of the risk mitigation or prevention functionality, as also described hereinabove (block 614). Moreover, in some aspects, an insurance provider remote server (implementations of which are discussed above) may adjust an insurance premium or discount by receiving telematics data from an insured mobile device, which telematics data may include an indication of a level of usage of the alert, recommendation, and/or other functionality discussed herein (block 614).

The method 600 may include additional, less, or alternate actions, including those discussed elsewhere herein, and/or may be implemented via one or more local or remote processors (e.g., mobile device, train, EMS vehicle, non-emergency vehicle, and/or remote server processors), or via computer-executable instructions stored on non-transitory computer-readable medium or media.

EMS Vehicle Telematics Data

In one aspect, a computer-implemented method of using EMS vehicle (e.g., police, fire department, ambulance) telematics data to reduce risk of collisions may be provided. The method may include (1) receiving, via one or more autonomous vehicle processors (or associated transceivers), such as via wireless communication or data transmission, EMS vehicle telematics data associated with movement of an EMS vehicle directly or indirectly from a EMS vehicle in route to an emergency location, the EMS vehicle telematics data including GPS location, speed, route, heading, acceleration, and/or lane data; (2) determining, via the one or more autonomous vehicle processors, that a current route of the autonomous vehicle will interfere with the EMS vehicle's route (such as based upon a comparison of current EMS vehicle GPS location, speed, heading, and/or route information with current autonomous vehicle GPS location, speed, heading, and/or route information and a current time); (3) determining, via the one or more autonomous vehicle processors, an alternate route for the autonomous vehicle to take to avoid interfering with the EMS vehicle's route to the emergency location; and/or (4) directing, via the one or more autonomous vehicle processors, the autonomous vehicle to travel along the alternate route, or alternatively directing the autonomous vehicle to pull over to the side of the road to allow the EMS vehicle to pass unimpeded to facilitate safe travel for EMS vehicles.

The method may include additional, less, or alternate actions, including those discussed elsewhere herein. For the telematics data may include data selected from one or more of, and not limited to all of: a timestamp; one or more sensor metrics indicative of braking motion of the EMS vehicle; one or more sensor metrics indicative of acceleration motion of the EMS vehicle; one or more sensor metrics indicative of cornering motion of the EMS vehicle; and one or more sensor metrics indicative of a direction of the EMS vehicle. The telematics data may include speed, acceleration, deceleration, GPS location, lane information, and/or other data of, or associated with, the EMS vehicle. Additionally or alternatively, the telematics data may include one or more of, and not limited to all of: time, braking, acceleration, left turn, right turn, heading, GPS (Global Positioning System) speed, GPS latitude and longitude, gyroscope, battery level, and/or telephone usage information or data of, or associated with, the EMS Vehicle.

The method may include adjusting or generating an insurance discount for vehicles having the risk mitigation or prevention functionality associated with receiving a wireless communication broadcast including EMS vehicle telematics data, analyzing the EMS vehicle telematics data, and directing corrective actions based upon the EMS Vehicle telematics data.

Exemplary Computer System Configured to Use EMS Vehicle Telematics Data

As depicted by, and discussed in relation to, FIGS. 1, 2, and 6, in one aspect, a computer system configured to use emergency response system (EMS) vehicle telematics data to reduce risk of accidents may be provided. The computer system may include at least one of one or more processors or transceivers configured to: (1) receive, via wireless communication or data transmission, the EMS vehicle telematics data associated with an EMS vehicle directly or indirectly from the EMS vehicle when the EMS vehicle is en route to an emergency location, the EMS vehicle telematics data including at least one of GPS location, speed, route, heading, acceleration, or lane data; (2) determine, based upon the EMS vehicle telematics data, that a current route of an autonomous vehicle will interfere with the route of the EMS vehicle to the emergency location; (3) determine an alternate route for the autonomous vehicle to take to avoid interfering with the route of the EMS vehicle to the emergency location; and/or (4) direct the autonomous vehicle to one of (1) travel along the alternate route, or (2) pull over to a side of a road on the current route of the autonomous vehicle to allow the EMS vehicle to pass unimpeded to facilitate safe travel for EMS vehicles. Determining that the current route of the autonomous vehicle will interfere with the route of the EMS vehicle may be based upon a comparison via the one or more processors of (1) at least one of the GPS location, the speed, the heading, or the route data associated with the EMS vehicle with (2) at least one of (i) at least one of current GPS location, speed, heading, or route data associated with the autonomous vehicle or (ii) a current time.

The EMS vehicle telematics data may include data selected from one or more of, and not limited to all of: a timestamp; one or more sensor metrics indicative of braking motion of the EMS vehicle; one or more sensor metrics indicative of acceleration motion of the EMS vehicle; one or more sensor metrics indicative of cornering motion of the EMS vehicle; and one or more sensor metrics indicative of a direction of the EMS vehicle. The EMS vehicle telematics data may include at least one of the speed, the acceleration, deceleration, the GPS location, or the lane data associated with the EMS vehicle. The EMS vehicle telematics data may include one or more of, and not limited to all of: time, braking, the acceleration, left turn, right turn, the heading, GPS (Global Positioning System) speed, GPS latitude and longitude, gyroscope, battery level, and telephone usage data associated with the EMS vehicle, and/or other types of telematics or digital data discussed elsewhere herein.

The or more processors may be configured to at least one of display, adjust, or generate an insurance discount for at least one of autonomous vehicles or other vehicles based upon the at least one of the autonomous vehicles or the other vehicles having risk mitigation or prevention functionality associated with receiving wireless communication broadcasts including the EMS vehicle telematics data, analyzing the EMS vehicle telematics data, and directing corrective actions based upon the EMS vehicle telematics data, and/or a time or mileage usage-based insurance discount for the at least one of the autonomous or the other vehicles based upon a frequency or amount of use of the risk mitigation or prevention functionality associated with receiving wireless communication broadcasts including the EMS vehicle telematics data, analyzing the EMS vehicle telematics data, and directing corrective actions based upon the EMS vehicle telematics data. The system may include additional, less, or alternate functionality, including that discussed elsewhere herein.

Exemplary Method of Using EMS Vehicle Telematics Data

As depicted by, and discussed in relation to, FIGS. 1, 2, and 6, in another aspect, a computer-implemented method of using emergency response system (EMS) vehicle telematics data to reduce risk of accidents may be provided. The method may include (1) receiving, via at least one of one or more autonomous (or semi-autonomous) vehicle processors of an autonomous (or semi-autonomous) vehicle or associated transceivers via wireless communication or data transmission, the EMS vehicle telematics data associated with an EMS vehicle directly or indirectly from the EMS vehicle when the EMS vehicle is en route to an emergency location, the EMS vehicle telematics data including at least one of GPS location, speed, route, heading, acceleration, or lane data; (2) determining, via the one or more autonomous vehicle processors based upon the EMS vehicle telematics data, that a current route of the autonomous vehicle will interfere with the route of the EMS vehicle to the emergency location, (3) determining, via the one or more autonomous vehicle processors, an alternate route for the autonomous vehicle to take to avoid interfering with the route of the EMS vehicle to the emergency location; and/or (4) directing, via the one or more autonomous vehicle processors, the autonomous vehicle to one of (1) travel along the alternate route, or (2) pull over to a side of a road on the current route of the autonomous vehicle to allow the EMS vehicle to pass unimpeded to facilitate safe travel for EMS vehicles. Determining, via the one or more autonomous vehicle processors, that the current route of the autonomous vehicle will interfere with the route of the EMS vehicle to the emergency location may be based upon a comparison via the one or more autonomous vehicle processors of (1) at least one of the GPS location, the speed, the heading, or the route data associated with the EMS vehicle with (2) at least one of (i) at least one of current GPS location, speed, heading, or route data associated with the autonomous vehicle or (ii) at least one of a current time or a time that the current route of the autonomous vehicle and the route of the EMS vehicle to the emergency location will at least one of overlap or intersect.

The method may include at least one of displaying, adjusting or generating an insurance discount for vehicles having risk mitigation or prevention functionality associated with receiving a wireless communication broadcast including the EMS vehicle telematics data, analyzing the EMS vehicle telematics data, and directing corrective actions based upon the EMS vehicle telematics data, and/or a time or mileage usage-based insurance discount for vehicles based upon an amount of time or mile usage of the risk mitigation or prevention functionality. The method may include additional, less, or alternate functionality, including that discussed elsewhere herein, and/or may be implemented via one or more local or remote processors, transceivers, memory units, and other electronic componentry. The method may use the types of telematics and digital data discussed elsewhere herein.

Exemplary System of Using EMS Vehicle Telematics Data

As depicted by, and discussed in relation to, FIGS. 1, 2, and 6, in another aspect, a system of using emergency response system (EMS) vehicle telematics data to reduce risk of accidents may be provided. The system may include (1) an EMS vehicle configured to broadcast the EMS vehicle telematics data associated with the EMS vehicle while the EMS vehicle is en route to an emergency location, the EMS vehicle telematics data including at least one of GPS location, speed, route, heading, acceleration, or lane data; and/or (2) an autonomous (or semi-autonomous) vehicle configured to: receive the EMS vehicle telematics data directly or indirectly from the EMS vehicle; determine, based upon the EMS vehicle telematics data, that a current route of the autonomous vehicle will interfere with the route of the EMS vehicle to the emergency location; determine an alternate route for the autonomous vehicle to take to avoid interfering with the route of the EMS vehicle to the emergency location; and/or perform one or more of (i) directing the autonomous vehicle to travel along the alternate route, or (ii) directing the autonomous vehicle to pull over to a side of a road on the current route of the autonomous vehicle to allow the EMS vehicle to pass unimpeded to facilitate safe travel for EMS vehicles.

The system may include an external computing device configured to at least one of adjust or generate an insurance discount for vehicles having risk mitigation or prevention functionality associated with receiving a wireless communication broadcast including the EMS vehicle telematics data, analyzing the EMS vehicle telematics data, and directing corrective actions based upon the EMS vehicle telematics data. The autonomous vehicle may be configured to determine that the current route of the autonomous vehicle will interfere with the route of the EMS vehicle based upon a comparison via one or more processors of the autonomous vehicle of (1) at least one of the GPS location, the speed, the heading, or the route data associated with the EMS vehicle with (2) at least one of (i) at least one of current GPS location, speed, heading, or route data associated with the autonomous vehicle or (ii) at least one of a current time or a time that the current route of the autonomous vehicle and the route of the EMS vehicle to the emergency location will at least one of overlap or intersect. The system may include additional, less, or alternate functionality, including that discussed elsewhere herein, and the telematics data may include that discussed elsewhere herein.

Additional Considerations

With the foregoing, an insurance customer may opt-in to a rewards, insurance discount, or other type of program. After the insurance customer provides their affirmative consent, an insurance provider telematics application and/or remote server may collect telematics and/or other data (including image or audio data) associated with insured assets, including before, during, and/or after an insurance-related event or vehicle collision. In return, risk-averse drivers, and/or vehicle owners may receive discounts or insurance cost savings related to auto, home, life, and/or other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, one EMS vehicle, etc., aspects include any suitable number of computing devices, vehicles, EMS vehicles, etc. For example, aspects include an external computing device receiving telematics data and/or geographic location data from a large number of computing devices (e.g., 100 or more mobile computing devices), and issuing alerts to those computing devices in which the alerts are relevant in accordance with the various techniques described herein.

Although the foregoing text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors, and/or processor-implemented modules, may be located in a single location (e.g., within a vehicle environment, an EMS vehicle environment, an infrastructure component, a home environment, an office environment or as a server farm), while in other embodiments the processor(s) and/or processor-implemented modules may be distributed across a number of locations.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may implement numerous alternate embodiments, using either current technology or technology developed after the filing date of this application.

What is claimed:
1. A computer system configured to use emergency response system (EMS) vehicle telematics data to reduce accident risk, the computer system comprising:
   at least one processor or associated transceiver, the at least one processor or associated transceiver located on or within an autonomous vehicle, the at least one processor or associated transceiver configured to:
   receive, at the autonomous vehicle via wireless communication or data transmission, the EMS vehicle telematics data associated with an EMS vehicle;
   determine, at the autonomous vehicle based upon the EMS vehicle telematics data, whether a current route of the autonomous vehicle will interfere with a route of the EMS vehicle to an emergency location;
   when the autonomous vehicle based upon the EMS vehicle telematics data, determines that the current route of the autonomous vehicle will interfere with the route of the EMS vehicle to the emergency location, determine, at the autonomous vehicle, an alternate route for the autonomous vehicle to take to avoid interfering with the route of the EMS vehicle to the emergency location;

direct, based upon a relevance of the EMS vehicle, the autonomous vehicle to travel along the alternate route; and cause an insurance provider remote server to at least one of display, adjust, or generate an insurance discount associated with the autonomous vehicle based upon the autonomous vehicle including risk mitigation or prevention functionality associated with (1) receiving the EMS vehicle telematics data, and (2) directing corrective actions so as to incentivize an insured customer to facilitate avoidance of collisions and safe travel for the EMS vehicle.

2. The computer system of claim 1, wherein the at least one processor or associated transceiver are configured to determine whether the current route of the autonomous vehicle will interfere with the route of the EMS vehicle is further based upon telematics data associated with the autonomous vehicle.

3. The computer system of claim 2, wherein the telematics data associated with the autonomous vehicle includes at least one of location, acceleration, deceleration, braking, cornering, direction, heading, left turn, right turn, speed, lane, or gyroscope data associated with the autonomous vehicle.

4. The computer system of claim 1, wherein the at least one processor or associated transceiver are configured to determine whether the current route of the autonomous vehicle will interfere with the route of the EMS vehicle to the emergency location is based upon at least one of (1) at least one of the location data or the at least one of the acceleration data or the deceleration data, or (2) comparison via the at least one processor of (i) the at least one of the location data or the at least one of the acceleration data or the deceleration data with (ii) at least one of a current time or at least one of location data, speed data, direction data, heading data, or route data associated with the autonomous vehicle.

5. The computer system of claim 1, wherein the EMS vehicle telematics data includes one or more of time, braking, cornering, direction, heading, left turn, right turn, speed, lane, GPS (Global Positioning System) latitude and longitude, gyroscope, battery level, or telephone usage data associated with the EMS vehicle.

6. The computer system of claim 1, further comprising the insurance provider remote server, wherein the at least one processor or associated transceiver are configured to send an indication to the insurance provider remote server that the autonomous vehicle includes the risk mitigation or prevention functionality associated with (1) receiving the EMS vehicle telematics data, and (2) directing the corrective actions based upon the relevance of the EMS vehicle, so as to cause the insurance provider remote server to at least one of display, adjust, or generate the insurance discount associated with the autonomous vehicle.

7. The computer system of claim 6, wherein the at least one processor or associated transceiver are configured to send an indication of an amount of usage of the risk mitigation or prevention functionality to the insurance provider remote server so as to cause the insurance provider remote server to at least one of display, adjust, or generate the insurance discount as a time or mileage usage-based insurance discount.

8. A computer-implemented method of using emergency response system (EMS) vehicle telematics data to reduce accident risk, the method comprising:

receiving, at an autonomous vehicle via at least one processor or associated transceiver located on or within the autonomous vehicle, via wireless communication or data transmission, the EMS vehicle telematics data associated with an EMS vehicle;

determining, at the autonomous vehicle via the at least one processor based upon the EMS vehicle telematics data, whether a current route of the autonomous vehicle will interfere with a route of the EM S vehicle to an emergency location;

when the autonomous vehicle based upon the EMS vehicle telematics data, determines that the current route of the autonomous vehicle will interfere with the route of the EMS vehicle to the emergency location, determining, at the autonomous vehicle via the at least one processor, an alternate route for the autonomous vehicle to take to avoid interfering with the route of the EMS vehicle to the emergency location;

directing, via the at least one processor, based upon a relevance of the EMS vehicle, the autonomous vehicle to travel along the alternate route; and causing, via the at least one processor or associated transceiver, an insurance provider remote server to at least one of display, adjust, or generate an insurance discount associated with the autonomous vehicle based upon the autonomous vehicle including risk mitigation or prevention functionality associated with (1) receiving the EMS vehicle telematics data, and (2) directing corrective actions so as to incentivize an insured customer to facilitate avoidance of collisions and safe travel for the EMS vehicle.

9. The computer-implemented method of claim 8, the method comprising determining, via the at least one processor, whether the current route of the autonomous vehicle will interfere with the route of the EMS vehicle is further based upon telematics data associated with the autonomous vehicle.

10. The computer-implemented method of claim 9, wherein the telematics data associated with the autonomous vehicle includes at least one of location, acceleration, deceleration, braking, cornering, direction, heading, left turn, right turn, speed, lane, or gyroscope data associated with the autonomous vehicle.

11. The computer-implemented method of claim 8, wherein determining, via the at least one processor, whether the current route of the autonomous vehicle will interfere with the route of the EMS vehicle is based upon at least one of (1) at least one of the location data or the at least one of the acceleration data or the deceleration data, or (2) comparison via the at least one processor of (i) the at least one of the location data or the at least one of the acceleration data or the deceleration data with (ii) at least one of a current time or at least one of location data, speed data, direction data, heading data, or route data associated with the autonomous vehicle.

12. The computer-implemented method of claim 8, wherein the EMS vehicle telematics data includes one or more of time, braking, cornering, direction, heading, left turn, right turn, speed, lane, GPS (Global Positioning System) latitude and longitude, gyroscope, battery level, or telephone usage data associated with the EMS vehicle.

13. The computer-implemented method of claim 8, the method comprising sending, via the at least one processor or associated transceiver, an indication to the insurance provider remote server that the autonomous vehicle includes the risk mitigation or prevention functionality associated with (1) receiving the EMS vehicle telematics data, and (2)

directing the corrective actions based upon the relevance of the EMS vehicle, so as to cause the insurance provider remote server to at least one of display, adjust, or generate the insurance discount associated with the autonomous vehicle.

14. The computer-implemented method of claim 13, the method comprising sending, via the at least one processor or associated transceiver, an indication of an amount of usage of the risk mitigation or prevention functionality to the insurance provider remote server so as to cause the insurance provider remote server to at least one of display, adjust, or generate the insurance discount as a time or mileage usage-based insurance discount.

15. A system of using emergency response system (EMS) vehicle telematics data to reduce accident risk, the system comprising:
- an EMS vehicle configured to transmit the EMS vehicle telematics data associated with the EMS vehicle,
- an autonomous vehicle; and
- at least one processor or associated transceiver located on or within the autonomous vehicle, the at least one processor or associated transceiver configured to:
- receive, at the autonomous vehicle, the EMS vehicle telematics data;
- determine, at the autonomous vehicle based upon the EMS vehicle telematics data, whether a current route of the autonomous vehicle will interfere with a route of the EMS vehicle to an emergency location;
- when the autonomous vehicle based upon the EMS vehicle telematics data, determines that the current route of the autonomous vehicle will interfere with the route of the EMS vehicle to the emergency location, determine, at the autonomous vehicle, an alternate route for the autonomous vehicle to take to avoid interfering with the route of the EMS vehicle to the emergency location;
- direct, based upon a relevance of the EMS vehicle, the autonomous vehicle to travel along the alternate route; and
- cause an insurance provider remote server to at least one of display, adjust, or generate an insurance discount associated with the autonomous vehicle based upon the autonomous vehicle having risk mitigation or prevention functionality associated with (1) receiving the EMS vehicle telematics data, and (2) directing corrective actions so as to incentivize an insured customer to facilitate avoidance of collisions and safe travel for the EMS vehicle.

16. The system of claim 15, wherein the at least one processor or associated transceiver are configured to determine whether the current route of the autonomous vehicle will interfere with the route of the EMS vehicle is further based upon telematics data associated with the autonomous vehicle.

17. The system of claim 16, wherein the telematics data associated with the autonomous vehicle includes at least one of location, acceleration, deceleration, braking, cornering, direction, heading, left turn, right turn, speed, lane, or gyroscope data associated with the autonomous vehicle.

18. The system of claim 15, wherein the at least one processor or associated transceiver are configured to determine whether the current route of the autonomous vehicle will interfere with the route of the EMS vehicle to the emergency location is based upon at least one of (1) at least one of the location data or the at least one of the acceleration data or the deceleration data, or (2) comparison via the at least one processor of (i) the at least one of the location data or the at least one of the acceleration data or the deceleration data with (ii) at least one of a current time or at least one of location data, speed data, direction data, heading data, or route data associated with the autonomous vehicle.

19. The system of claim 15, wherein the EMS vehicle telematics data includes one or more of time, braking, cornering, direction, heading, left turn, right turn, speed, lane, GPS (Global Positioning System) latitude and longitude, gyroscope, battery level, or telephone usage data associated with the EMS vehicle.

20. The system of claim 15, further comprising the insurance provider remote server, wherein the at least one processor or associated transceiver are configured to send an indication to the insurance provider remote server that the autonomous vehicle includes the risk mitigation or prevention functionality associated with (1) receiving the EMS vehicle telematics data, and (2) directing the corrective actions based upon the relevance of the EMS vehicle, so as to cause the insurance provider remote server to at least one of display, adjust, or generate the insurance discount associated with the autonomous vehicle.

* * * * *